(12) United States Patent
Shimizu et al.

(10) Patent No.: US 8,319,930 B2
(45) Date of Patent: Nov. 27, 2012

(54) LIQUID-CRYSTAL DISPLAY APPARATUS COMPRISING DISPLAY PIXELS AND VISION-ANGLE CONTROL PIXELS HAVING A VISION-ANGLE CONTROL CIRCUIT

(75) Inventors: Koji Shimizu, Nagano (JP); Toshiharu Matsushima, Tottori (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 12/903,609

(22) Filed: Oct. 13, 2010

(65) Prior Publication Data

US 2011/0090418 A1  Apr. 21, 2011

(30) Foreign Application Priority Data

Oct. 20, 2009  (JP) ................ P2009-241113

(51) Int. Cl.
*G02F 1/1343* (2006.01)
(52) U.S. Cl. ................ 349/144; 349/142
(58) Field of Classification Search .......... 349/41–43, 349/49, 87, 96, 102, 103, 113, 123, 139–144, 349/146

See application file for complete search history.

(56) References Cited

U.S. PATENT DOCUMENTS

| 2008/0143930 | A1* | 6/2008 | Jin et al. ............... 349/96 |
| 2008/0165297 | A1 | 7/2008 | Matsushima |
| 2008/0291223 | A1* | 11/2008 | Yamazaki et al. ....... 345/690 |
| 2009/0231530 | A1* | 9/2009 | Nishimura ............ 349/129 |
| 2009/0303420 | A1* | 12/2009 | Kim et al. ............. 349/96 |
| 2010/0128208 | A1* | 5/2010 | Kurasawa ............. 349/106 |

FOREIGN PATENT DOCUMENTS

JP  2008-191645  8/2008

* cited by examiner

*Primary Examiner* — Mark Robinson
*Assistant Examiner* — Paul Lee
(74) *Attorney, Agent, or Firm* — K&L Gates LLP

(57) ABSTRACT

A liquid-crystal display apparatus includes: display pixels each located at an intersection of a scan line and a data line and each provided with a display-pixel switching device, a display pixel electrode, and a liquid-crystal layer; vision-angle control pixels each located at an intersection of the scan line and a vision-angle control line and each provided with a vision-angle control pixel switching device, a vision-angle control pixel electrode, and a transmittance exhibited for a vision angle to serve as a transmittance with a characteristic different from that of the transmittance of the display pixel or a reflectance exhibited for a vision angle to serve as a reflectance with a characteristic different from that of the reflectance of the display pixel; a scan-line driving circuit; and a vision-angle control circuit.

7 Claims, 13 Drawing Sheets

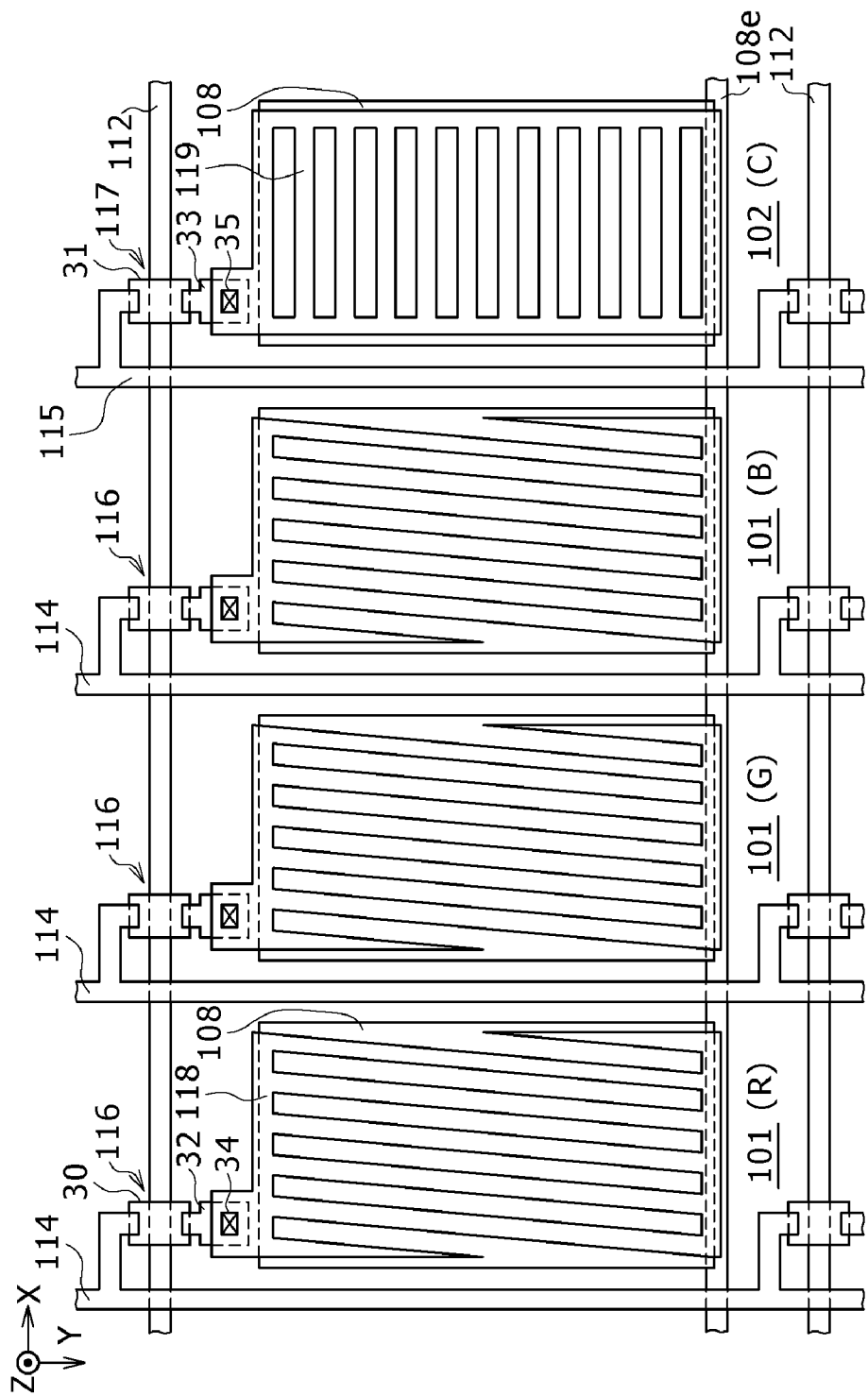

LIQUID-CRYSTAL DISPLAY APPARATUS COMPRISING DISPLAY PIXELS AND VISION-ANGLE CONTROL PIXELS HAVING A VISION-ANGLE CONTROL CIRCUIT

CROSS REFERENCES TO RELATED APPLICATIONS

The present application claims priority to Japanese Priority Patent Application JP 2009-241113 filed in the Japan Patent Office on Oct. 20, 2009, the entire content of which is hereby incorporated by reference.

BACKGROUND

The present application relates to a liquid-crystal display apparatus having a vision-angle control function and an electronic apparatus which employs the liquid-crystal display apparatus.

As the display section of an electronic apparatus such as a mobile phone or a PDA (personal digital assistant), a liquid-crystal display apparatus is widely used. That is because the liquid-crystal display apparatus offers merits such as a small size, a small thickness and a low power consumption. In the liquid-crystal display apparatus employed in the electronic apparatus of this type, a wide vision angle is normally required. In some cases, however, a narrow vision angle is temporarily required so that other people are not capable of peeping the display. In order to meet both the requirements, there has been proposed a liquid-crystal display apparatus in which vision-angle control pixels are provided in addition to display pixels, and vision-angle control is carried out to put the vision-angle control pixels in an OFF or ON state so as to provide the liquid-crystal display apparatus a vision-angle control function capable of switching from a state of a narrow vision angle corresponding to the ON state to a state of a wide vision angle corresponding to the OFF state and vice versa. For more information on the proposed liquid-crystal display apparatus, the reader is advised to refer to documents such as Japanese Patent Laid-Open No. 2008-191645 (FIG. 2).

SUMMARY

As the size of the display section employed in an electronic apparatus is increased and/or the resolution of the display section is raised, however, loads also become heavier. Typical examples of the loads are the vision-angle control pixels employed in the liquid-crystal display apparatus serving as the display section and wires connected to the vision-angle control pixels. Thus, it is feared that the capability of writing data into the vision-angle control pixels also deteriorates.

As a solution to the problems described above, inventors of the present application have presented a technology for preventing the capability of writing data into the vision-angle control pixels from deteriorating.

As a solution to the problems described above, according to an embodiment, there is provided a liquid-crystal display apparatus employing display pixels each located at an intersection of a scan line and a data line and each provided with

- a display-pixel switching device having a specific node connected to the data line and another node which is connected to the specific node to establish a conductive state of the display-pixel switching device when a select voltage is applied to the scan line,
- a display pixel electrode connected to the other node of the display-pixel switching device, and
- a liquid-crystal layer driven by a voltage appearing between the display pixel electrode and a common electrode.

The liquid-crystal display apparatus further employs vision-angle control pixels each located at an intersection of the scan line and a vision-angle control line and each provided with

- a vision-angle control pixel switching device having a specific node connected to the vision-angle control line and another node which is connected to the specific node to establish a conductive state of the vision-angle control pixel switching device when a select voltage is applied to the scan line,
- a vision-angle control pixel electrode connected to the other node of the vision-angle control pixel switching device, and
- a transmittance exhibited for a vision angle to serve as a transmittance with a characteristic different from that of the transmittance of the display pixel or a reflectance exhibited for a vision angle to serve as a reflectance with a characteristic different from that of the reflectance of the display pixel.

The liquid-crystal display apparatus further employs a scan-line driving circuit for sequentially selecting the scan line from a plurality of aforementioned scan lines in an order determined in advance and applying the select voltage to the selected scan line, and a vision-angle control circuit for supplying a vision-angle control signal set at a voltage corresponding to a state of vision-angle control to the vision-angle control pixel connected to the selected scan line, to which the select voltage has been applied by the scan-line driving circuit, through the vision-angle control line.

As described above, in accordance with the embodiment, a vision-angle control signal set at a voltage corresponding to a state of the vision-angle control is written into the vision-angle control pixel sequentially in a write operation by adjusting the write operation to an operation to apply the select voltage to the scan line. Thus, it is possible to reduce a load to be borne in the write operation and assure a sufficient write capability An embodiment can be provided with a configuration including a data-line driving circuit for supplying a data signal set at a voltage corresponding to the gradation component of the display pixel connected to the selected scan line, to which the select voltage has been applied by the scan-line driving circuit, to the display pixel through the data line.

In addition, in such a configuration, it is desirable to have the vision-angle control circuit drive two or more vision-angle control lines as a group of lines in bulk. Thus, the number of operations to output the vision-angle control signal from the vision-angle control circuit can be reduced. As a result, it is possible to make the vision-angle control circuit simpler and to reduce the cost.

The vision-angle control circuit may provide two or more vision-angle control pixels with a vision-angle control signal set at a voltage corresponding to an ON or OFF state of the vision-angle control. Thus, the vision-angle control can be put in the ON state on the basis of an arbitrary display pattern. In addition, the vision-angle control circuit may also provide two or more aforementioned vision-angle control pixels with a vision-angle control signal set at a voltage corresponding to a state level of the vision-angle control. Thus, the state level of the vision-angle control can also be changed on the basis of an arbitrary display pattern.

On top of that, it is desirable to provide the present application with a configuration in which the vision-angle control line does not intersect with the data line. In accordance with this configuration, it is possible to prevent noises accompanying changes of a voltage appearing on the vision-angle control line from being introduced to the data line to be mixed with a data signal conveyed by the data line.

It is to be noted that the present application can be applied to not only the liquid-crystal display apparatus described above, but also an electronic apparatus which employs the liquid-crystal display apparatus.

Additional features and advantages are described herein, and will be apparent from the following Detailed Description and the figures.

BRIEF DESCRIPTION OF THE FIGURES

FIG. 4 is a top-view diagram showing the configurations of the color display sub-pixel and the vision-angle control pixel which are employed in the liquid-crystal display apparatus according to the first embodiment;

DETAILED DESCRIPTION

The present application is described below with reference to the drawings according to an embodiment.

First Embodiment

Figure 1:
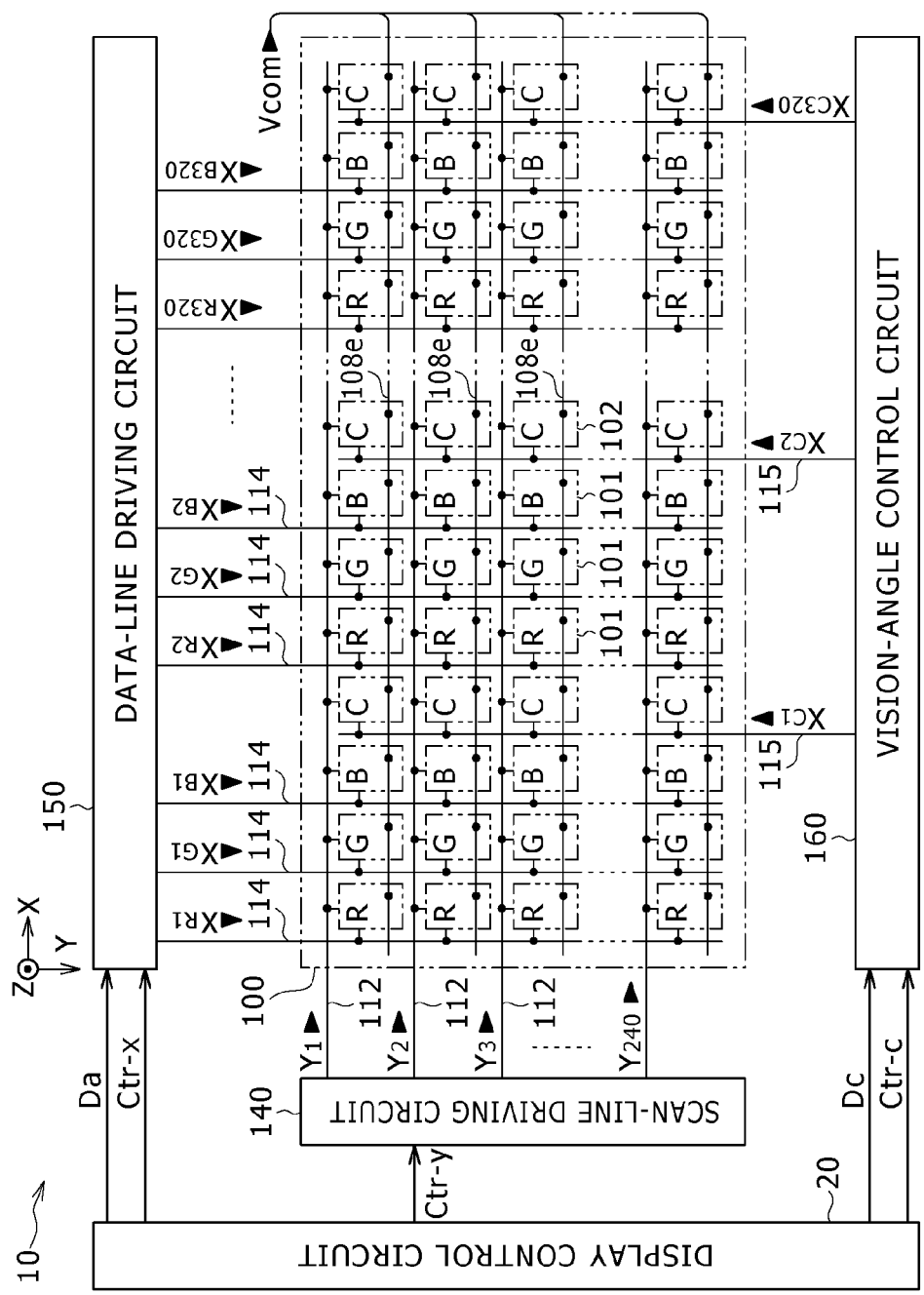
FIG. 1 is a block diagram showing the configuration of a liquid-crystal display apparatus according to a first embodiment.

FIG. 1 is a block diagram showing the configuration of a liquid-crystal display apparatus 10 according to a first embodiment.

As shown in the block diagram of FIG. 1, the liquid-crystal display apparatus 10 is configured to employ a display panel 100 and sections surrounding the display panel 100. The sections surrounding the display panel 100 include a display control circuit 20, a scan-line driving circuit 140, a data-line driving circuit 150 and a vision-angle control circuit 160.

Figure 2:
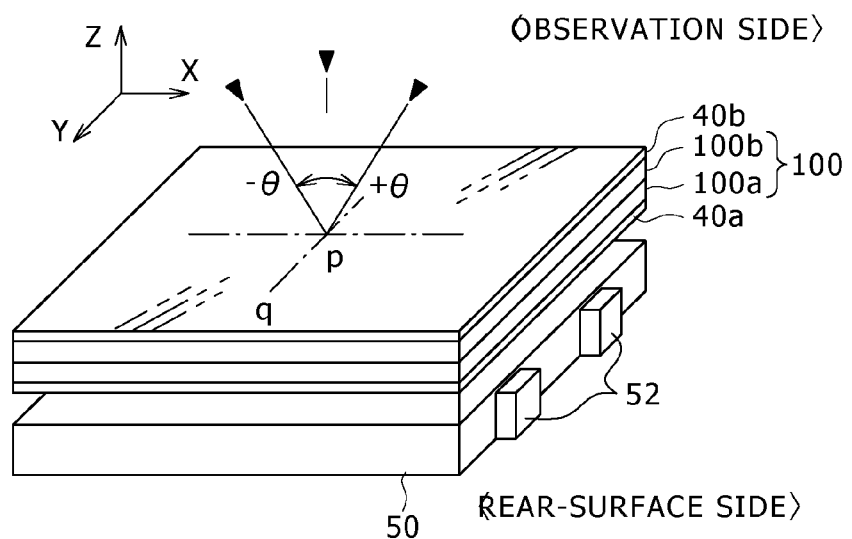
FIG. 2 is a perspective-view diagram showing the configuration of sections (including a display panel) employed in the liquid-crystal display apparatus according to the first embodiment.

As is obvious from FIG. 2 which is a perspective-view diagram showing the configuration of sections (including the display panel 100) employed in the liquid-crystal display apparatus 10 according to the first embodiment, the display panel 100 employed in the liquid-crystal display apparatus is configured to have a device substrate 100a and a device-substrate facing substrate 100b which is pasted on the device substrate 100a, sandwiching a fixed gap in conjunction with the device substrate 100a. It is to be noted that a liquid-crystal layer 105 is included in the fixed gap between the device substrate 100a and the device-substrate facing substrate 100b. In the perspective-view diagram of FIG. 2, however, the liquid-crystal layer 105 itself is not shown.

On the rear-surface side of the display panel 100, a backlight 50 having LEDs 52 is provided. The backlight 50 radiates white-color light in a direction to the observation side. In addition, a polarization plate 40a is provided on the rear-surface side of the device substrate 100a whereas a polarization plate 40b is provided on the observation side of the device-substrate facing substrate 100b.

As shown in the block diagram of FIG. 1, the display panel 100 includes 240 row scan lines 112 laid in the horizontal (or X) direction and 960 (=320×3) column data lines 114 laid in the vertical (or Y) direction. The 960 column data lines 114 are electrically insulated from the 240 row scan lines 112. In addition, a color display sub-pixel 101 is provided at an intersection of each of the 240 row scan lines 112 and each of the 960 column data lines 114.

Three color display sub-pixels 101 adjacent to each other in the X direction are pixels for the R (red), G (green) and B (blue) colors respectively. By adopting an additive color mixing technique to mix colors generated by the three color display sub-pixels 101 for the R (red), G (green) and B (blue) colors respectively, it is possible to configure a compound pixel which serves as a color display unit. Thus, in this embodiment, a matrix of color display units arranged to form 240 rows and 320 columns is created.

It is to be noted that, in the case of a color display as is the case with this embodiment, one compound pixel used as a color display unit is configured to have a plurality of color display sub-pixels 101 for different colors. In this configuration, the color display sub-pixels 101 composing a color display unit form a display compound pixel. In the case of a single-color display to be described later, on the other hand, a display pixel is one pixel serving as a color display unit.

A column vision-angle control line 115 is also laid in the Y direction for every three column data lines 114. Thus, there are a total of 320 column vision-angle control lines 115. The 320 column vision-angle control lines 115 are electrically insulated from the 240 row scan lines 112. In addition, a vision-angle control pixel 102 is provided at an intersection of each of the 240 row scan lines 112 and each of the 320 column vision-angle control lines 115.

Thus, in an embodiment, a vision-angle control pixel 102 is provided for every three color display sub-pixels 101 of the R, G and B colors respectively.

In the block diagram of FIG. 1, a specific one of the two ends of each column data line 114 is pulled to the upper side and connected to the data-line driving circuit 150. On the other hand, a specific one of the two ends of each column vision-angle control line 115 is pulled to the lower side of the block diagram of FIG. 1 and connected to the vision-angle control circuit 160. The lower side of the block diagram of FIG. 1 is the side opposite to the upper side on which the data-line driving circuit 150 is provided.

It is to be noted that functions of the display control circuit 20, the scan-line driving circuit 140, the data-line driving circuit 150 and the vision-angle control circuit 160 will be described later.

Figure 3:
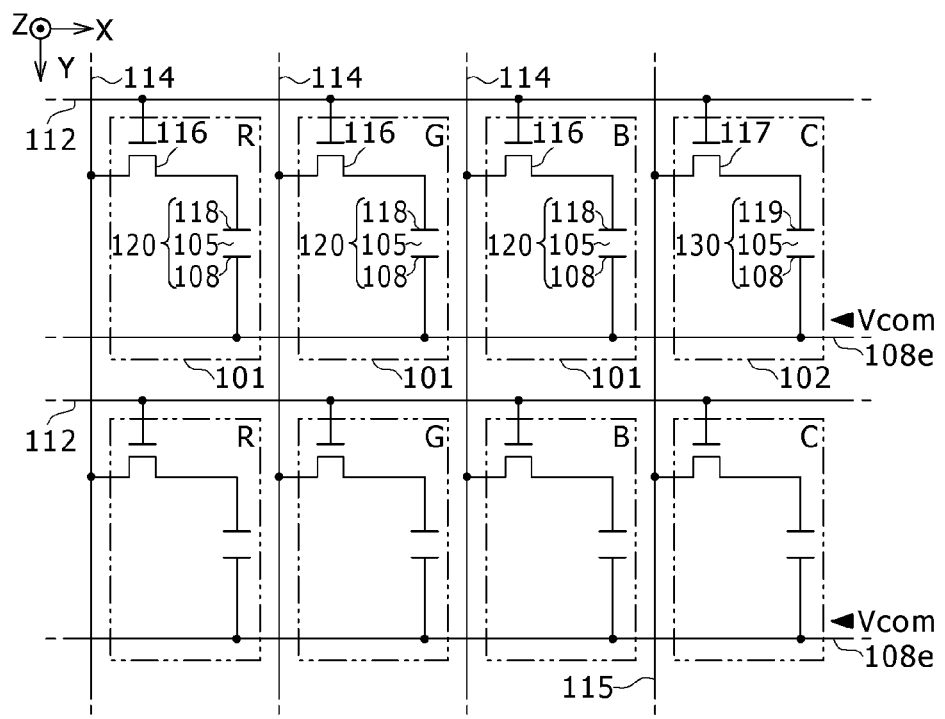
FIG. 3 is a circuit diagram showing equivalent circuits of a color display sub-pixel and a vision-angle control pixel which are employed in the liquid-crystal display apparatus according to the first embodiment.

FIG. 3 is a circuit diagram showing equivalent circuits of the color display sub-pixel 101 and the vision-angle control pixel 102 which are employed in the liquid-crystal display apparatus 10 according to the first embodiment. The circuit diagram of FIG. 3 shows equivalent circuits for two rows adjacent to each other.

As shown in the circuit diagram of FIG. 3, the three color display sub-pixels 101 of the R, G and B colors respectively each have an equivalent circuit electrically identical with the equivalent circuit of the vision-angle control pixel 102. Each of the equivalent circuits of the three color display sub-pixels 101 for the R, G and B colors respectively is configured to have a TFT (thin film transistor) 116 of the n channel type and a display pixel liquid-crystal capacitor 120. By the same token, the equivalent circuit of the vision-angle control pixel 102 is configured to have a TFT 117 of the n channel type and a vision-angle control pixel liquid-crystal capacitor 130.

In this embodiment, as described before, the display panel 100 is configured to include the device substrate 100a, the device-substrate facing substrate 100b and the liquid-crystal layer 105 which is sandwiched between the device substrate 100a and the device-substrate facing substrate 100b. The display panel 100 is set in an FFS (fringe field switching) mode. In this FFS mode, the direction of an electric field generated in the liquid-crystal layer 105 is the substrate surface direction. As will be described later, each of the color display sub-pixel 101 and the vision-angle control pixel 102 has a structure in which a pixel electrode is created over the surface of a common electrode 108, being separated away from the surface of the common electrode 108 by using an insulation layer or the like. Thus, a kind of capacitive component is created from the insulation layer or the like between the pixel electrode and the common electrode 108. This capacitive component is a liquid-crystal capacitor having a configuration in which the orientation direction of liquid-crystal molecules is changed in accordance with the electric field generated by a voltage applied to the liquid-crystal capacitor.

Since the pixel electrode of the color display sub-pixel 101 has a shape different from the shape of the pixel electrode of the vision-angle control pixel 102, however, the direction of the electric field working on the liquid-crystal layer 105 in the liquid-crystal capacitor employed in the color display sub-pixel 101 is different from the direction of the electric field working on the liquid-crystal layer 105 in the liquid-crystal capacitor employed in the vision-angle control pixel 102. It is therefore necessary to distinguish the direction of the electric field working on the liquid-crystal layer 105 in the liquid-crystal capacitor employed in the color display sub-pixel 101 from the direction of the electric field working on the liquid-crystal layer 105 in the liquid-crystal capacitor employed in the vision-angle control pixel 102. For this reason, in the following description, in order to distinguish the TFTs employed in the color display sub-pixel 101 and the vision-angle control pixel 102 from each other, the TFT employed in the color display sub-pixel 101 is denoted by reference numeral 116 whereas the TFT employed in the vision-angle control pixel 102 is denoted by reference numeral 117. By the same token, in order to distinguish the liquid-crystal capacitors employed in the color display sub-pixel 101 and the vision-angle control pixel 102 from each other, the liquid-crystal capacitor employed in the color display sub-pixel 101 is referred to as a display pixel liquid-crystal capacitor denoted by reference numeral 120 whereas the liquid-crystal capacitor employed in the vision-angle control pixel 102 is referred to as a vision-angle control pixel liquid-crystal capacitor denoted by reference numeral 130. In the same way, in order to distinguish the pixel electrodes employed in the color display sub-pixel 101 and the vision-angle control pixel 102 from each other, the pixel electrode employed in the color display sub-pixel 101 is referred to as a display pixel electrode denoted by reference numeral 118 whereas the pixel electrode employed in the vision-angle control pixel 102 is referred to as a vision-angle control pixel electrode denoted by reference numeral 119.

To put it in detail, in the color display sub-pixel 101, the gate electrode of the TFT 116 functioning as a display pixel switching device is connected to the row scan line 112 whereas the source electrode of the TFT 116 is connected to the column data line 114. The drain electrode of the TFT 116 is connected to the display pixel electrode 118. The display pixel electrode 118 also serves as a specific node of the display pixel liquid-crystal capacitor 120. Thus, the specific node of the display pixel liquid-crystal capacitor 120 is connected to the drain electrode of the TFT 116. The other node of the display pixel liquid-crystal capacitor 120 is the common electrode 108 which is connected to a common line 108e.

In the same way as the color display sub-pixel 101, in the vision-angle control pixel 102, the gate electrode of the TFT 117 functioning as a vision-angle control pixel switching device is connected to the row scan line 112 whereas the source electrode of the TFT 117 is connected to the column vision-angle control line 115. The drain electrode of the TFT 117 is connected to the vision-angle control pixel electrode 119. The vision-angle control pixel electrode 119 also serves as a specific node of the vision-angle control pixel liquid-crystal capacitor 130. Thus, the specific node of the vision-angle control pixel liquid-crystal capacitor 130 is connected to the drain electrode of the TFT 117. The other node of the vision-angle control pixel liquid-crystal capacitor 130 is the common electrode 108 which is connected to the common line 108e.

It is to be noted that a power supply circuit not shown in the circuit diagram of FIG. 3 supplies a voltage $V_{com}$ to the common line 108e.

FIG. 4 is a top-view diagram showing the configurations of the color display sub-pixel 101 and the vision-angle control pixel 102 which are employed in the liquid-crystal display apparatus 10 according to the first embodiment. The color display sub-pixels 101 for the R, G and B colors and the vision-angle control pixel 102 are pixels created on the device substrate 100a.

In this embodiment, each of the TFTs 116 and 117 is a transistor of the amorphous silicon type. Each of the TFTs 116 and 117 is configured to serve as a transistor of a bottom gate type which places the gate electrode on a side lower than a semiconductor layer. The side lower than a semiconductor layer is the side opposite to the surface of the page which shows the top-view diagram of FIG. 4.

In the top-view diagram of FIG. 4, the row scan line 112 and the common line 108e are created by applying a patterning technique to the gate wire serving as a first conductive layer. Then, a rectangular common electrode 108 is created, being superposed on the common line 108e by applying a patterning technique to an ITO (indium tin oxide) layer serving as a second conductive layer. By superposing the rectangular common electrode 108 on the common line 108e, the common electrode 108 is electrically connected to the common line 108e.

Subsequently, a gate insulation layer not shown in the top-view diagram of FIG. 4 is created. Then, a semiconductor layer 30 of the TFT 116 and a semiconductor layer 31 of the TFT 117 are each created as a layer having an island shape. Subsequently, a patterning technique is applied to a metallic layer serving as a third conductive layer in order to create the column data line 114 also serving as the source electrode of the TFT 116, the column vision-angle control line 115 also serving as the source electrode of the TFT 117, the drain electrode 32 of the TFT 116 and the drain electrode 33 of the TFT 117.

Then, after an inter-layer insulation film not shown in the top-view diagram of FIG. 4 is made, a contact hole 34 reaching the drain electrode 32 is created in the color display sub-pixel 101 as a hole penetrating the inter-layer insulation film whereas a contact hole 35 reaching the drain electrode 33 is created in the vision-angle control pixel 102 as a hole penetrating the inter-layer insulation film.

Subsequently, a patterning technique is applied to an ITO layer serving as a fourth conductive layer in order to create the display pixel electrode 118 having a comb-teeth shape and the vision-angle control pixel electrode 119 having a ladder shape. When viewed from a position above the display pixel electrode 118, the display pixel electrode 118 appears to be superposed on the drain electrode 32. By the same token, when viewed from a position above the vision-angle control pixel electrode 119, the vision-angle control pixel electrode 119 appears to be superposed on the drain electrode 33.

Thus, the display pixel electrode 118 is connected to the drain electrode 32 through the contact hole 34 whereas the vision-angle control pixel electrode 119 is connected to the drain electrode 33 through the contact hole 35.

Subsequently, an orientation film made from a polyimide material or the like is created over an orientation area and a rubbing process in an anti-parallel direction parallel to the Y direction is carried out on the orientation film. In this case, a polarization plate 40a provided on the rear-surface side of the device substrate 100a is set in such a way that the transmission axis is oriented in a direction perpendicular to the rubbing direction.

On the device-substrate facing substrate 100b not shown in the top-view diagram of FIG. 4 in particular, a light shielding layer having an aperture section is provided in an area facing the common electrode 108. In addition, in the color display sub-pixel 101, a color filter for one of the R, G and B colors is provided at the aperture section. In the vision-angle control pixel 102, on the other hand, no color filter is provided at the aperture section so that the aperture section is put in a pierced state.

It is to be noted that, on the device-substrate facing substrate 100b, an orientation film similar to that of the device substrate 100a is created on a surface brought into contact with the liquid-crystal layer 105. The direction of the rubbing process carried out on this orientation film is an anti-parallel direction parallel to the Y direction. The direction of the rubbing process carried out on this orientation film is the same direction as the direction of the rubbing process carried out on the orientation film of the device substrate 100a. In addition, a polarization plate 40b provided on the observation side of the device-substrate facing substrate 100b is set in such a way that the transmission axis is oriented in the same direction as the rubbing direction.

Light radiated to the display panel 100 from the backlight 50 on the rear-surface side of the display panel 100 is converted by the polarization plate 40a into linearly polarized light incident on each of the color display sub-pixel 101 and the vision-angle control pixel 102.

If the voltage applied to the display pixel liquid-crystal capacitor 120 provided between the common electrode 108 and the display pixel electrode 118 in the color display sub-pixel 101 is an OFF voltage, the liquid-crystal molecules in the display pixel liquid-crystal capacitor 120 are oriented in a direction according to the rubbing direction so that the linearly polarized light incident on the liquid-crystal layer 105 is emitted from the liquid-crystal layer 105 with the state of the linearly polarized light incident on the liquid-crystal layer 105 sustained as it is. Since the direction of the linearly polarized light is all but the same as that of the absorption axis, however, the linearly polarized light is blocked off by the polarization plate 40b.

Figure 5A:
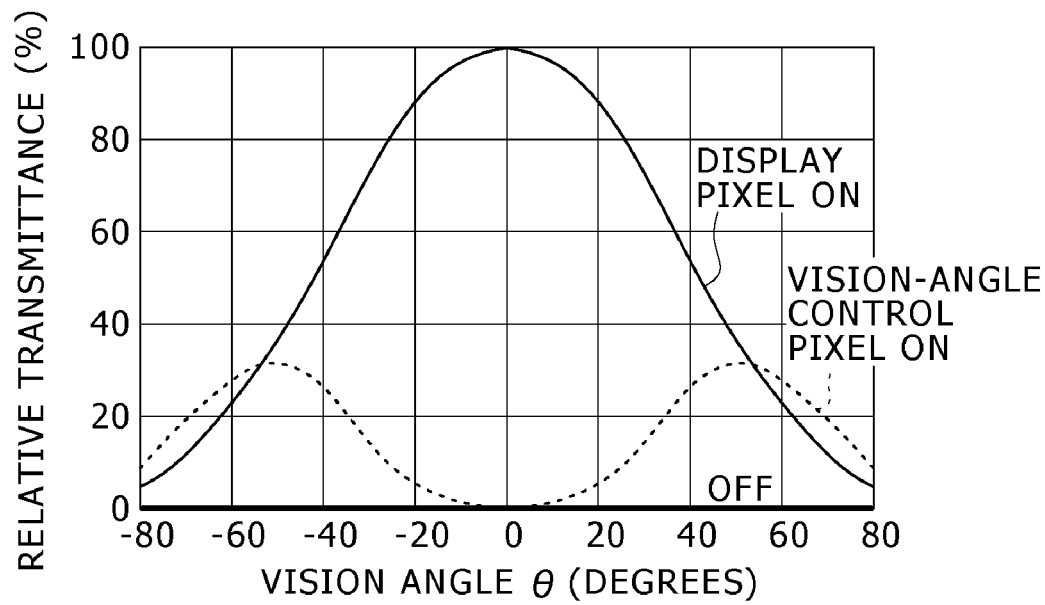
FIGS. 5A and 5B are a plurality of diagrams showing vision-angle characteristics of the liquid-crystal display apparatus according to the first embodiment.

Thus, if the OFF voltage is being applied in the color display sub-pixel 101, the color display sub-pixel 101 is put in a dark state as indicated by the word "off" in a diagram of FIG. 5A without regard to the magnitude of the vision angle θ.

With regard to the vision angle, as shown in the perspective diagram of FIG. 2, the azimuth of the substrate normal direction from an observed pixel p to the observation side is taken as an azimuth of 0 degrees. The observed pixel p is a pixel, the transmittance of which is taken as a subject of measurement. The vision angle is prescribed as an angle θ of a rotation made by taking an axis q as the center of rotation. As shown in the perspective diagram of FIG. 2, the axis q is an axis which passes through the observed pixel p and is parallel to the Y direction.

If a voltage applied between the common electrode 108 and the display pixel electrode 118 in the color display sub-pixel 101 is an ON voltage, on the other hand, liquid-crystal molecules in the display pixel liquid-crystal capacitor 120 are oriented in a direction which is all but perpendicular to slits in the display pixel electrode 118. Thus, the liquid-crystal layer 105 gives a phase difference to linearly polarized light incident on the liquid-crystal layer 105 so that, before the liquid-crystal layer 105 emits the linearly polarized light, the polarization direction of the linearly polarized light is converted from the polarization direction at the incidence time into a direction perpendicular to the polarization direction at the incidence time. Since the polarization direction obtained as a result of the conversion is all but the same as the direction of the transmission axis of the polarization plate 40b, the linearly polarized light passes through the polarization plate 40b.

Thus, if an ON voltage is being applied in the color display sub-pixel 101, the color display sub-pixel 101 is put in a bright state in which the linearly polarized light is visually recognized. In this bright state, as indicated by a curve marked by the phrase "display pixel on" in the diagram of FIG. 5A to serve as a curve representing the vision angle characteristic of the color display sub-pixel 101, as the vision angle θ increases from −80 degrees, the relative transmittance increases, reaching a maximum value at a vision angle θ of 0 degrees. As the vision angle θ further increases, however, the relative transmittance decreases gradually.

It is to be noted that, in the case of the curves shown in the diagram of FIG. 5A, the maximum value of the relative transmittance is 100% whereas the minimum value of the relative transmittance is 0%.

Figure 5B:
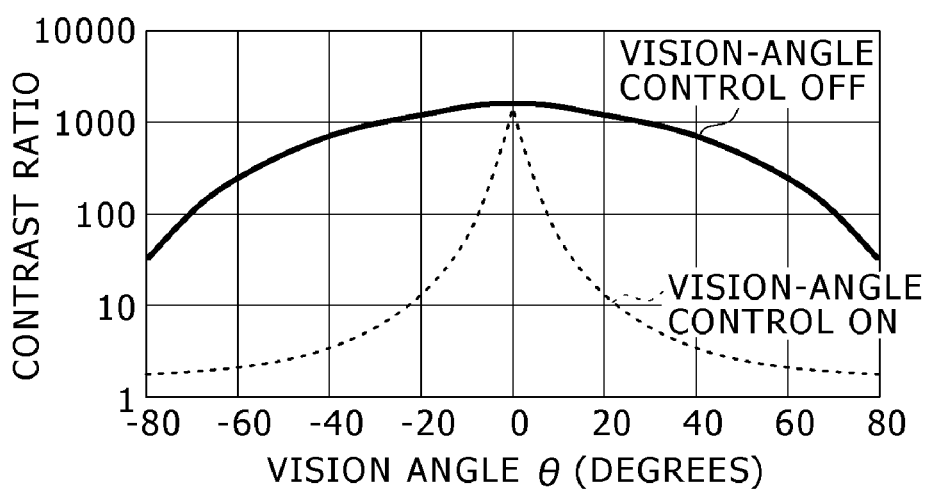

On the other hand, if a voltage applied to the vision-angle control pixel liquid-crystal capacitor 130 between the common electrode 108 and the vision-angle control pixel electrode 119 in the vision-angle control pixel 102 is an OFF voltage, for the same reason as the color display sub-pixel 101, the vision-angle control pixel 102 is put in a dark state as indicated by the word "off" in the diagram of FIG. 5B without regard to the magnitude of the vision angle θ in the same way as the color display sub-pixel 101.

Thus, if an OFF voltage is being applied to the vision-angle control pixel 102 and control is executed to set the color display sub-pixel 101 at a transmittance corresponding to the R, G or B component of the color display sub-pixel 101, an image based on light transmitted by the color display sub-pixel 101 can be visually recognized throughout a wide range of vision angles θ in the so-called wide vision-angle mode.

From the contrast-ratio point of view, the following description explains the fact that an image based on light transmitted by the color display sub-pixel 101 can be visually recognized throughout a wide range of vision angles θ in the so-called wide vision-angle mode. FIG. 5B is a diagram showing relations between the contrast ratio and the vision angle θ. As is obvious from a solid-line curve shown in the diagram of FIG. 5B, the contrast ratio is equal to or greater than 20 for vision angles θ in the range −80 degrees to +80 degrees. Thus, if the vision angle θ has a value in the range −80 degrees to +80 degrees, the image can be seen with ease from a position separated away from the liquid-crystal display apparatus in any direction.

If a voltage applied to the vision-angle control pixel liquid-crystal capacitor 130 between the common electrode 108 and the vision-angle control pixel electrode 119 in the vision-angle control pixel 102 is an ON voltage, on the other hand, liquid-crystal molecules on the side of the device substrate 100a in the vision-angle control pixel liquid-crystal capacitor 130 are oriented in a direction all but perpendicular to the substrate direction. If this state of orientation is seen from a position separated away from the device substrate 100a in a direction corresponding to a vision angle θ of zero, there is no phase difference change in the liquid-crystal layer 105. Thus, as is obvious from a dashed-line curve shown in the diagram of FIG. 5A to serve as a curve representing the vision-angle characteristic of the vision-angle control pixel 102, at a vision angle θ of zero, the dark state is established. If this state of orientation is seen from a position separated away from the device substrate 100a in an inclined direction corresponding to a vision angle other than the angle θ of zero, on the other hand, a phase difference change is generated in the liquid-crystal layer 105, changing the transmittance of the vision-angle control pixel 102. To put it in detail, when the vision angle θ is increased from 0 degrees to about +50 degrees or decreased from 0 degrees to about −50 degrees, the transmittance increases to a maximum value in accordance with a phase difference change, which is generated in the liquid-crystal layer 105 in accordance with the increase or decrease in vision angle θ, attaining the maximum value at a vision angle θ of about +50 degrees or about −50 degrees respectively. As the vision angle θ is further increased from +50 degrees or further decreased from −50 degrees, however, the transmittance conversely decreases in accordance with a phase difference change which is generated in the liquid-crystal layer 105.

Thus, when an ON voltage is being applied to the vision-angle control pixel 102, the vision-angle control pixel 102 shows a black display of the dark state when seen from a position separated away from the display panel 100 in a direction perpendicular to the front face. When seen from a position separated away from the display panel 100 in a direction inclined with respect to the front face, however, the display looks brighter by an amount which corresponds to the increase in transmittance.

Therefore, if an ON voltage is being applied to the vision-angle control pixel 102 and control is executed to set the color display sub-pixel 101 at a transmittance corresponding to the R, G or B component of the color display sub-pixel 101, an image based on light transmitted by the color display sub-pixel 101 can be visually recognized from a position separated away from the display panel 100 in a direction perpendicular to the front face. For a position separated in a direction inclined with respect to the front face, however, the contrast ratio decreases due to the fact that, even though the transmittance of the color display sub-pixel 101 does not change much, the transmittance of the vision-angle control pixel 102 increases. Thus, if an ON voltage is being applied to the vision-angle control pixel 102, an image based on light transmitted by the color display sub-pixel 101 can be made difficult to visually recognize from a position other than the position separated away from the display panel 100 in a direction perpendicular to the front face. The liquid-crystal display apparatus 10 is said to operate in a narrow vision-angle mode defined as a mode in which an image based on light transmitted by the color display sub-pixel 101 can be visually recognized from a position separated away from the display panel 100 in a direction perpendicular to the front face, but made difficult to visually recognize from a position other than the position separated away from the display panel 100 in a direction perpendicular to the front face.

As is obvious from a dashed-line curve shown in the diagram of FIG. 5B, the contrast ratio is not greater than 2 for vision angles θ not greater than −50 degrees and vision angles θ not smaller than +50 degrees. Thus, for vision angles θ not greater than −50 degrees and vision angles θ not smaller than +50 degrees, the image is very difficult to see.

As described above, the liquid-crystal display apparatus 10 is set in the wide vision angle if an OFF voltage is applied to the vision-angle control pixels 102 and the liquid-crystal display apparatus 10 is conversely set in the narrow vision angle if an ON voltage is applied to the vision-angle control pixels 102. For a configuration in which the ON or OFF voltage is applied to all vision-angle control pixels 102 at the same time, the insufficient capability of writing a voltage into the vision-angle control pixel liquid-crystal capacitor 130 employed in each of the vision-angle control pixels 102 becomes a problem. This problem typically becomes extremely serious in not only a configuration in which the capacitance per vision-angle control pixel liquid-crystal capacitor 130 as well as the resistance and parasitic capacitance of the column vision-angle control line 115 rise due to the increased size of the display panel 100, but also a configuration in which the number of liquid-crystal capacitors 130 rises due to the increased resolution of the display panel 100.

In order to solve the problem described above, the ON or OFF voltage is applied to all vision-angle control pixels 102 not at the same time. Instead, the ON or OFF voltage is applied to only some vision-angle control pixels 102 at one time and this operation to apply the ON or OFF voltage to only some vision-angle control pixels 102 is repeated a plurality of times in order eventually apply the ON or OFF voltage to all vision-angle control pixels 102. It is the display control circuit 20, the scan-line driving circuit 140, the data-line driving circuit 150 and the vision-angle control circuit 160 that form a main configuration for repeating the operation to apply the ON or OFF voltage to only some vision-angle control pixels 102 a plurality of times in order eventually apply the ON or OFF voltage to all vision-angle control pixels 102.

The display control circuit 20 is a section for generating a variety of control signals for controlling a variety of sections employed in the liquid-crystal display apparatus. To put it in detail, the display control circuit 20 generates a control signal Ctr-y for controlling the scan-line driving circuit 140, a control signal Ctr-x for controlling the data-line driving circuit 150 and a control signal Ctr-c for controlling the vision-angle control circuit 160.

The scan-line driving circuit 140 is a section for supplying a scan signal to each of the scan lines 112 each laid on one of rows 1 to 240 in accordance with the control signal Ctr-y received from the display control circuit 20.

To put it in detail, first of all, the scan-line driving circuit 140 selects a row scan line 112 from those laid on rows 1 to 240 in an order of row 1, row 2, row 3 and so on to row 240. In addition, the scan-line driving circuit 140 raises a scan signal V, asserted on the selected row scan line 112 to an H level corresponding to a select voltage $V_{GH}$ and pulls down a scan signal $V_j$ asserted on each of scan lines 112 other than the selected row scan line 112 from the H level to an L level corresponding to a deselect voltage $V_{GL}$. Thus, the scan signal asserted on a row scan line 112 is also referred to as a select voltage in claims of this application specification.

Figure 7:
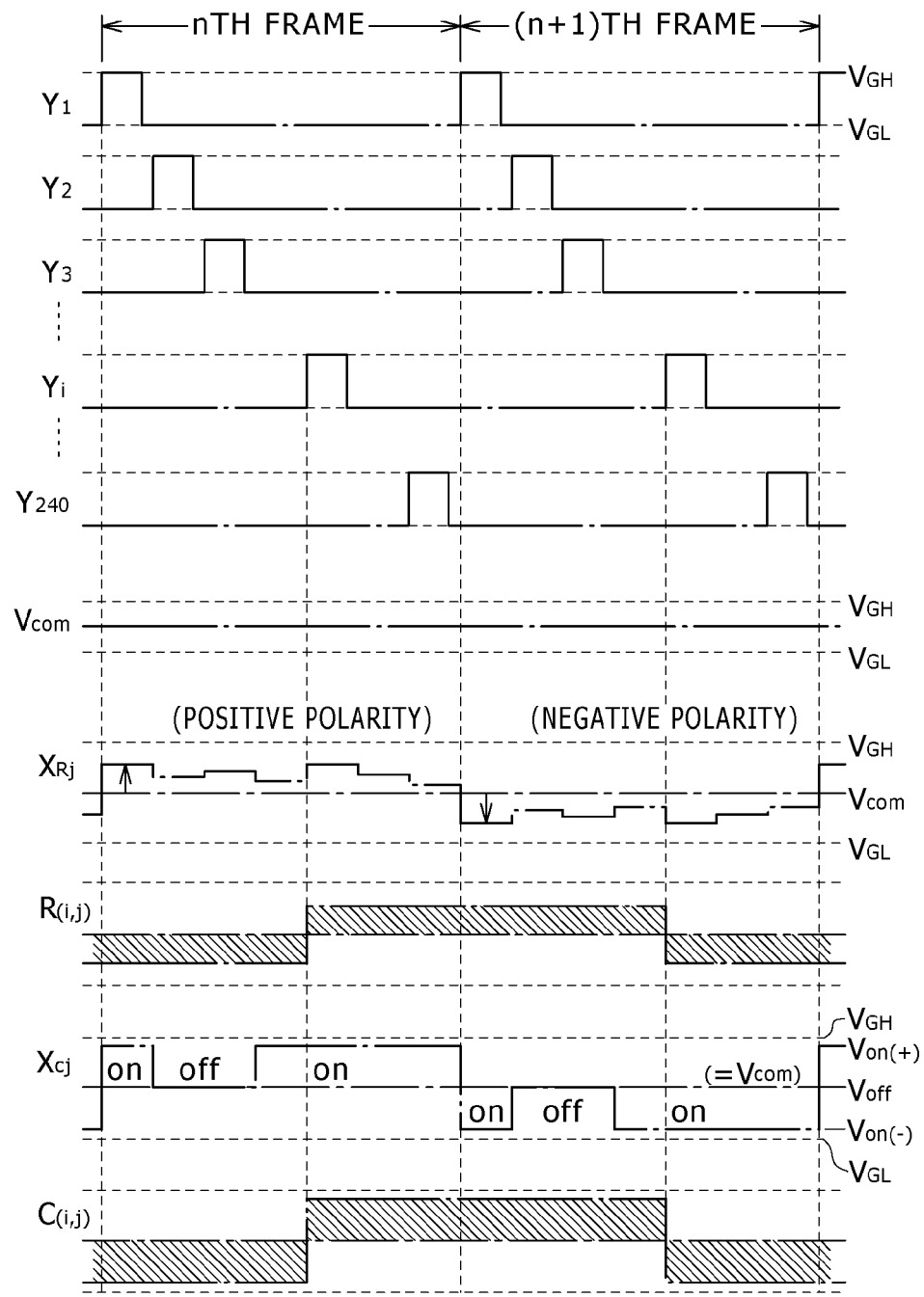
FIG. 7 is a timing diagram to be referred to in description of operations carried out by the liquid-crystal display apparatus according to the first embodiment.

For the sake of convenience, in the following description, scan signals asserted on the scan lines 112 laid on row 1, row 2, row 3 and so on to row 240 are denoted by reference notation $Y_1$, reference notation $Y_2$, reference notation $Y_3$ and so on to reference notation $Y_{240}$ respectively. The select voltage $V_{GH}$, the deselect voltage $V_{GL}$ and the scan signals $Y_1$ to $Y_{240}$ are shown in FIG. 7 which is a timing diagram to be referred to in description of operations carried out by the liquid-crystal display apparatus 10 according to the first embodiment.

The vision-angle control circuit 160 is a section for supplying a vision-angle control signal $X_{Cj}$ set at a voltage corresponding to the ON or OFF state of the vision-angle control to a vision-angle control pixel 102, which is located on a row scan line 112 selected by the scan-line driving circuit 140, through a column vision-angle control line 115 connected to the vision-angle control pixel 102. The vision-angle control signal $X_{Cj}$ is shown in the timing diagram of FIG. 7.

To put it in detail, the vision-angle control circuit 160 has a storage area corresponding to the matrix of vision-angle control pixels 102. The storage area not shown in the block diagram of FIG. 1 is used for storing vision-angle control bit data Dc which is used specifying the ON or OFF state of the vision-angle control for each of the vision-angle control pixels 102. From the storage area, the vision-angle control circuit 160 reads out the vision-angle control bit data Dc for vision-angle control pixels 102 placed on a row of the matrix cited above to serve as vision-angle control pixels 102 which are connected to a row scan line 112 selected by the scan-line driving circuit 140. In addition, the vision-angle control circuit 160 converts the vision-angle control bit data Dc read out from the storage area as vision-angle control bit data Dc specifying the ON or OFF state of the vision-angle control into a vision-angle control signal $X_{Cj}$ set at a voltage corresponding to the ON or OFF state of the vision-angle control. Subsequently, the vision-angle control circuit 160 asserts the vision-angle control signals $X_{Cj}$ on the vision-angle control lines 115 which then convey the signals $X_{Cj}$ to the vision-angle control pixels 102. The vision-angle control circuit 160 concurrently supplies the vision-angle control signals $X_{Cj}$ to the vision-angle control pixels 102 connected to a row scan line 112 selected by the scan-line driving circuit 140 for all the 320 columns allocated to the vision-angle control pixels 102.

It is to be noted that, in the following description, the vision-angle control signals $X_{Cj}$ supplied to vision-angle control pixels 102 placed on column 1 (that is, the left-most column of the matrix), column 2, column 3 and so on to column 320 (that is, the right-most column of the matrix) are denoted by reference notation $X_{C1}$, reference notation $X_{C2}$, reference notation $X_{C3}$ and so on to reference notation $X_{C320}$ respectively. That is to say, a vision-angle control signal supplied to vision-angle control pixels 102 placed on column n (that is, the nth column counted from the left end) is denoted by reference notation $X_{Cn}$.

In addition, the liquid-crystal display apparatus 10 is configured so that, when the ON state of the vision-angle control for any vision-angle control pixel 102 is changed to the OFF state or vice versa, the display control circuit 20 provides the vision-angle control circuit 160 with new vision-angle control bit data Dc to be used by the vision-angle control circuit 160 to update data stored in the storage area.

The data-line driving circuit 150 is a section for supplying a data signal $X_{Rj}$ set at a voltage corresponding to a gradation component for one of the R, G and B colors of a color display sub-pixel 101 to the color display sub-pixel 101, which is located on a row scan line 112 selected by the scan-line driving circuit 140, through a column data line 114 connected to the color display sub-pixel 101. The data signal $X_{Rj}$ is also shown in the timing diagram of FIG. 7.

To put it in detail, the data-line driving circuit 150 has a storage area corresponding to the matrix of color display sub-pixels 101. The storage area not shown in the block diagram of FIG. 1 is used for storing display data bits Da which are each used specifying a gradation component corresponding to one of the R, G and B colors for one of the color display sub-pixels 101. From the storage area, the data-line driving circuit 150 reads out the display data bits Da corresponding to color display sub-pixels 101 placed on a row of the matrix cited above to serve as color display sub-pixels 101 which are connected to a row scan line 112 selected by the scan-line driving circuit 140. In addition, the vision-angle control circuit 160 converts each of the display data bits Da read out from the storage area as a display data bit Da specifying a gradation component corresponding to one of the R, G and B colors for a color display sub-pixel 101 into a data signal $X_{Rj}$ set at a voltage corresponding to the gradation component for one of the R, G and B colors. Subsequently, the data-line driving circuit 150 asserts the data signals $X_{Rj}$ on the data lines 114 which then convey the signals to the color display sub-pixels 101. The data-line driving circuit 150 concurrently supplies the data signals $X_{Rj}$ to the color display sub-pixels 101 connected to a row scan line 112 selected by the scan-line driving circuit 140 for all the 960 columns allocated to the color display sub-pixels 101.

It is to be noted that, in the following description, with the left-most compound pixel (that is, the left-most color display unit) on a row used as the first pixel for the row, a data signal $X_{Rj}$ supplied to a jth compound pixel counted from the left end (that is, a jth color display unit counted from the left end)

as a data signal $X_{Rj}$ for one of R, G and B colors is denoted by reference notations $X_{Rj}$, $X_{Gj}$ or $X_{Bj}$ respectively where subscript j used in this embodiment is an integer in the range of 1 to 320.

In addition, the liquid-crystal display apparatus 10 is configured so that, when the pixel data to be displayed is changed, the display control circuit 20 provides the data-line driving circuit 150 with new display data bits Da to be used by the data-line driving circuit 150 to update data stored in the storage area.

If a transistor of the amorphous type is used as each of the TFTs 116 and 117 in the display panel 100, for the display panel 100, each of the scan-line driving circuit 140, the data-line driving circuit 150 and the vision-angle control circuit 160 is implemented individually by adopting a COG (chip on glass) technology, or the scan-line driving circuit 140, the data-line driving circuit 150 and the vision-angle control circuit 160 are implemented as a semiconductor pair chip properly combining the functions of the scan-line driving circuit 140, the data-line driving circuit 150 and the vision-angle control circuit 160 by adoption of the COG technology.

Figure 6:
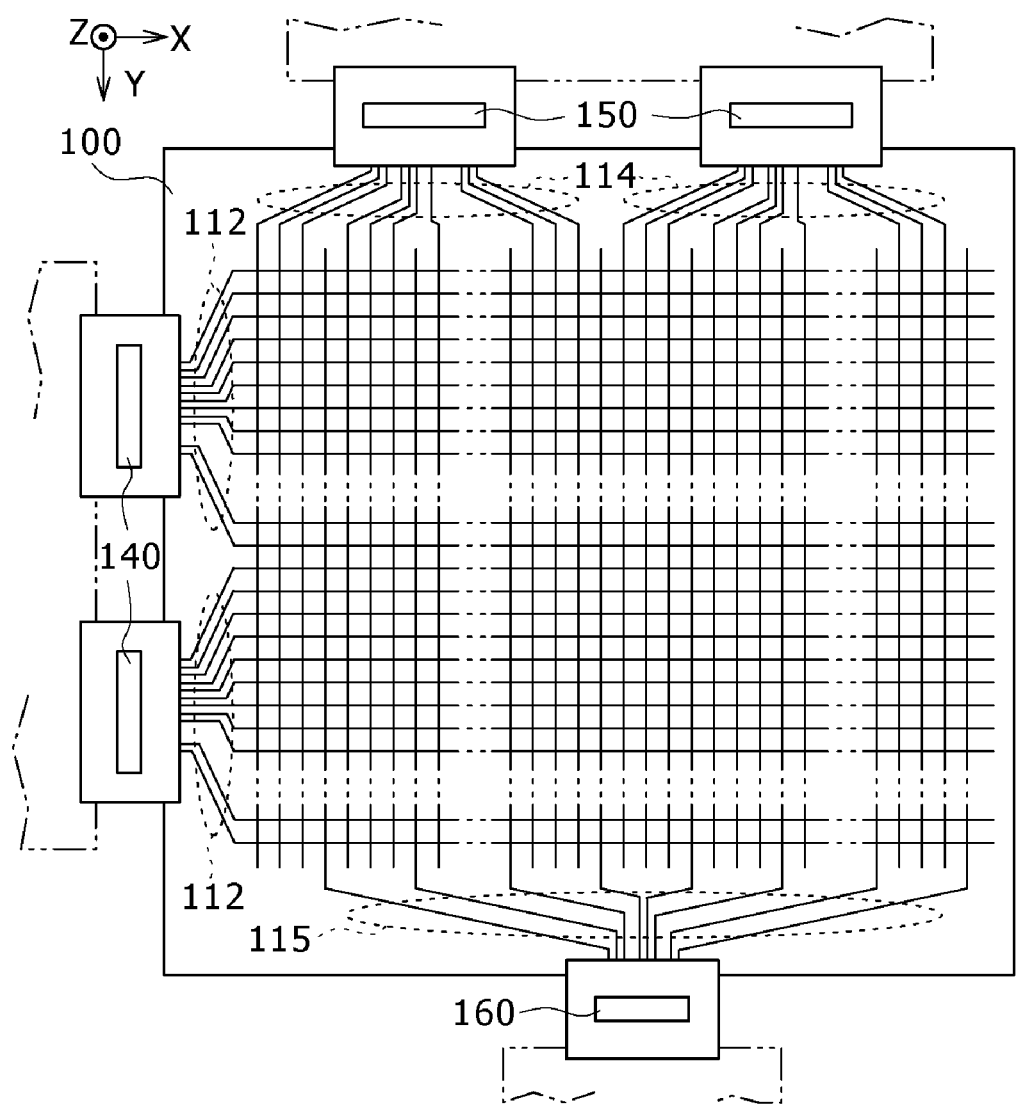
FIG. 6 is a top-view diagram showing the configurations of the components including the display panel.

In addition, instead of implementing each of the scan-line driving circuit 140 and the data-line driving circuit 150 as a chip, each of the scan-line driving circuit 140 and the data-line driving circuit 150 is created as two separate chips respectively as shown in FIG. 6 which is a top-view diagram showing the configurations of the components including the display panel 100. As an alternative, each of the scan-line driving circuit 140 and the data-line driving circuit 150 is created as three or more separate chips and implemented on the display panel 100 by adoption of a COF (chip on film) technology or the like. It is to be noted that, in the case of the configurations shown in the top-view diagram of FIG. 6, the display control circuit 20 is provided on an area side indicated by a double-dotted dashed line. In addition, the vision-angle control circuit 160 can also be created as two or more separate chips.

On top of that, in another structure of the TFTs 116 and 117, from a gate-position point of view, each of the TFTs 116 and 117 can be designed as a transistor of a top gate type and, from a process point of view, each of the TFTs 116 and 117 can be created as a transistor of a poly-silicon type. If each of the TFTs 116 and 117 is implemented as a transistor of a poly-silicon type, the configuration elements such as the scan-line driving circuit 140, the data-line driving circuit 150 and the vision-angle control circuit 160 can be created on an element substrate at locations surrounding the matrix of pixels.

Next, operations to store a voltage in the liquid-crystal display apparatus 10 are explained by referring to the timing diagram of FIG. 7.

As described earlier and as is obvious from the timing diagram of FIG. 7, during a frame period, the scan-line driving circuit 140 selects a row scan line 112 from those laid on rows 1 to 240 in an order of row 1, row 2, row 3 and so on to row 240. In addition, the scan-line driving circuit 140 raises a scan signal $V_i$ asserted on the selected row scan line 112 to an H level corresponding to a select voltage $V_{GH}$ and pulls down a scan signal $V_j$ (other than the scan signal $V_i$) asserted on each of scan lines 112 other than the selected row scan line 112 from the H level to an L level corresponding to a deselect voltage $V_{GL}$. This operation is repeated for all the row scan lines 112 throughout the frame period.

It is to be noted that the frame period is a period required to display one frame of an image by driving the display panel 100. If the vertical scan frequency of the display panel 100 is 60 Hz, the frame period is 16.7 milliseconds which are obtained by computing the reciprocal of the vertical scan frequency.

In this embodiment, when each of the display pixel liquid-crystal capacitor 120 and the vision-angle control pixel liquid-crystal capacitor 130 is driven by making use of an alternating-current voltage, a frame reversal method is adopted. In accordance with the frame reversal method, throughout a frame period, the polarity of a written voltage is sustained as it is but the polarity is inverted for the next frame period. To put it more concretely, throughout an nth frame period shown in the timing diagram of FIG. 7, the display control circuit 20 is specifying the positive polarity but, throughout the next (n+1)th frame period immediately lagging behind the nth frame period as shown in the same timing diagram, the display control circuit 20 is specifying the negative polarity. Thereafter, the display control circuit 20 inverts the polarity once every frame period.

It is to be noted that the positive polarity means the polarity of a voltage applied to the display pixel liquid-crystal capacitor 120 to serve as a voltage which causes an electrical potential appearing on the side of the display pixel electrode 118 to be higher than an electrical potential appearing on the side of the common electrode 108. In addition, the positive polarity also means the polarity of a voltage applied to the vision-angle control pixel liquid-crystal capacitor 130 to serve as a voltage which causes an electrical potential appearing on the side of the vision-angle control pixel electrode 119 to be higher than an electrical potential appearing on the side of the common electrode 108. On the other hand, the negative polarity means the polarity of a voltage applied to the display pixel liquid-crystal capacitor 120 to serve as a voltage which causes an electrical potential appearing on the side of the display pixel electrode 118 to be lower than an electrical potential appearing on the side of the common electrode 108. In addition, the negative polarity also means the polarity of a voltage applied to the vision-angle control pixel liquid-crystal capacitor 130 to serve as a voltage which causes an electrical potential appearing on the side of the vision-angle control pixel electrode 119 to be lower than an electrical potential appearing on the side of the common electrode 108.

On top of that, with regard to voltages except the voltage applied to the display pixel liquid-crystal capacitor 120 or the vision-angle control pixel liquid-crystal capacitor 130, a ground electric potential not shown in the timing diagram of FIG. 7 is used as a reference voltage which is a zero voltage. As is obvious from the above description, the voltage applied to the display pixel liquid-crystal capacitor 120 is a difference between the electric potential appearing on the common electrode 108 and the display pixel electrode 118 whereas the voltage applied to the vision-angle control pixel liquid-crystal capacitor 130 is a difference between the electric potential appearing on the common electrode 108 and the vision-angle control pixel electrode 119. It is thus necessary to distinguish the voltage applied to the display pixel liquid-crystal capacitor 120 or the vision-angle control pixel liquid-crystal capacitor 130 from the other voltages.

First of all, in the nth frame period, the scan-line driving circuit 140 raises the scan signal $Y_1$ from the L level to the H level.

Thus, during a sub-period in the nth frame period, the scan signal $Y_1$ is sustained at the H level. In this sub-period, the data-line driving circuit 150 reads out display data bits Da for color display sub-pixels 101 placed on row 1 and converts the display data bits Da into data signals (such as data signals $X_{Rj}$) set at voltages each specified by a display data bit Da as a difference between the electric potential appearing on the display pixel electrode 118 on the high side and the voltage $V_{com}$ serving as a reference. Subsequently, the data-line driving circuit 150 asserts the data signals on the data lines 114 which then convey the signals to the color display sub-pixels 101 on the row. The data-line driving circuit 150 concurrently supplies the data signals to the color display sub-pixels 101 connected to a row scan line 112 selected by the scan-line driving circuit 140 for all the 960 columns allocated to the color display sub-pixels 101.

Thus, for example, an R-color data signal $X_{Rj}$ for the jth color display sub-pixel 101 counted from the left end of row 1 is set at a voltage which is a difference between the electric potential appearing on the display pixel electrode 118 on the high side and the voltage $V_{com}$ serving as a reference. This voltage is a voltage corresponding to an R-color gradation component specified by the display data bit Da for the R color of the R-color color display sub-pixel 101 included in the compound pixel placed at the intersection of row 1 and column j. In the timing diagram of FIG. 7, this voltage is a voltage indicated by symbol ↑.

As described above, during a sub-period in the nth frame period, the scan signal $Y_1$ is sustained at the H level. In this sub-period, on the other hand, the vision-angle control circuit 160 reads out vision-angle control bit data Dc for vision-angle control pixels 102 placed on row 1 and converts the vision-angle control bit data Dc into a vision-angle control signal $X_{Cj}$. To be more specific, if the vision-angle control bit data Dc specifies the ON state of the vision-angle control, the vision-angle control circuit 160 sets the vision-angle control signal $X_{Cj}$ at a voltage $V_{on(+)}$. If the vision-angle control bit data Dc specifies the OFF state of the vision-angle control, on the other hand, the vision-angle control circuit 160 sets the vision-angle control signal $X_{Cj}$ at the voltage $V_{com}$. The vision-angle control circuit 160 concurrently supplies the vision-angle control signals $X_{Cj}$ to the vision-angle control pixels 102 connected to a row scan line 112 selected by the scan-line driving circuit 140 for all the 320 columns allocated to the vision-angle control pixels 102.

As shown the timing diagram of FIG. 7, the vision-angle control circuit 160 sets a vision-angle control signal $X_{Cj}$ for the jth vision-angle control pixel 102 counted from the left end of row 1 at the voltage $V_{on(+)}$ during the sub-period in the nth frame period because the vision-angle control bit data Dc for the vision-angle control pixel 102 included in the color display unit located at the intersection of row 1 and column j specifies the ON state of the vision-angle control. As described above, during this sub-period in the nth frame period, the scan signal $Y_1$ is sustained at the H level.

When the scan signal $Y_1$ is set at the H level, each of the TFT 116 and the TFT 117 which are placed on row 1 is put in a turned-on state which is also referred to as a conductive state. Thus, the data signal (such as the data signal $X_{Rj}$) asserted on the column data line 114 is supplied to the display pixel electrode 118 located on row 1 by way of the TFT 116 which has been put in a turned-on state. As a result, a positive-polarity voltage corresponding to a gradation component for the color display sub-pixel 101 is applied to the display pixel liquid-crystal capacitor 120 included in the color display sub-pixel 101 which employs the TFT 116.

By the same token, the vision-angle control signal $X_{Cj}$ asserted on the column vision-angle control line 115 is supplied to the vision-angle control pixel electrode 119 located on row 1 by way of the TFT 117 which has also been put in a turned-on state. As a result, if the ON state of the vision-angle control has been specified, an ON voltage having the positive polarity defined before is applied to the vision-angle control pixel liquid-crystal capacitor 130 included in the vision-angle control pixel 102 which employs the TFT 117. If the OFF state of the vision-angle control has been specified, on the other hand, an OFF voltage which is a zero voltage is applied to the vision-angle control pixel liquid-crystal capacitor 130 included in the vision-angle control pixel 102 which employs the TFT 117.

It is to be noted that, when the scan signal $Y_1$ is changed from the H level to the L level, each of the TFT 116 and the TFT 117 which are placed on row 1 is put in a turned-off state which is also referred to as a nonconductive state. In the turned-off state, the voltages written into the display pixel liquid-crystal capacitor 120 and the vision-angle control pixel liquid-crystal capacitor 130 are held in the display pixel liquid-crystal capacitor 120 and the vision-angle control pixel liquid-crystal capacitor 130 by the capacitances of the display pixel liquid-crystal capacitor 120 and the vision-angle control pixel liquid-crystal capacitor 130 respectively.

Then, in the nth frame period, the scan-line driving circuit 140 raises the scan signal $Y_2$ from the L level to the H level. Thus, during a sub-period in the nth frame period, the scan signal $Y_2$ is sustained at the H level. In this sub-period, the data-line driving circuit 150 reads out display data bits Da for color display sub-pixels 101 placed on row 2 and converts the display data bits Da into data signals (such as data signals $X_{Rj}$) set at voltages which are each a difference between the electric potential appearing on the display pixel electrode 118 on the high side and the voltage $V_{com}$ serving as a reference. These voltages are voltages each specified by a display data bit Da. Subsequently, the data-line driving circuit 150 asserts the data signals $X_{Rj}$ on the data lines 114 which then convey the signals to the color display sub-pixels 101 on the row. The data-line driving circuit 150 concurrently supplies the data signals $X_{Rj}$ to the color display sub-pixels 101 connected to a row scan line 112 selected by the scan-line driving circuit 140 for all the 960 columns allocated to the color display sub-pixels 101.

In the mean time, in this sub-period, the vision-angle control circuit 160 reads out vision-angle control bit data Dc for vision-angle control pixels 102 placed on row 2 and converts the vision-angle control bit data Dc into a vision-angle control signal $X_{Cj}$. To be more specific, if the vision-angle control bit data Dc specifies the ON state of the vision-angle control, the vision-angle control circuit 160 sets the vision-angle control signal $X_{Cj}$ at a voltage $V_{on(+)}$. If the vision-angle control bit data Dc specifies the OFF state of the vision-angle control, on the other hand, the vision-angle control circuit 160 sets the vision-angle control signal $X_{Cj}$ at the voltage $V_{com}$. The vision-angle control circuit 160 concurrently supplies the vision-angle control signals $X_{Cj}$ to the vision-angle control pixels 102 connected to a row scan line 112 selected by the scan-line driving circuit 140 for all the 320 columns allocated to the vision-angle control pixels 102.

When the scan signal $Y_2$ is set at the H level, each of the TFT 116 and the TFT 117 which are placed on row 2 is put in a turned-on state which is also referred to as a conductive state. Thus, the data signal $X_{Rj}$ asserted on the column data line 114 is supplied to the display pixel electrode 118 located on row 2 by way of the TFT 116 which has been put in a turned-on state. As a result, a positive-polarity voltage corresponding to a gradation component for the color display sub-pixel 101 is applied to the display pixel liquid-crystal capacitor 120 included in the color display sub-pixel 101 which employs the TFT 116.

By the same token, the vision-angle control signal $X_{Cj}$ asserted on the column vision-angle control line 115 is supplied to the vision-angle control pixel electrode 119 located on row 2 by way of the TFT 117 which has also been put in a turned-on state. As a result, if the ON state of the vision-angle control has been specified, an ON voltage having the positive polarity defined before is applied to the vision-angle control pixel liquid-crystal capacitor 130 included in the vision-angle control pixel 102 which employs the TFT 117. If the OFF state of the vision-angle control has been specified, on the other hand, an OFF voltage which is a zero voltage is applied to the vision-angle control pixel liquid-crystal capacitor 130 included in the vision-angle control pixel 102 which employs the TFT 117.

It is to be noted that, as shown the timing diagram of FIG. 7, the vision-angle control circuit 160 sets a vision-angle control signal $X_{Cj}$ for the jth vision-angle control pixel 102 counted from the left end of row 2 at the voltage $V_{com}$ during the sub-period in the nth frame period because the vision-angle control bit data Dc for the vision-angle control pixel 102 included in the color display unit located at the intersection of row 2 and column j specifies the OFF state of the vision-angle control. As described above, during this sub-period in the nth frame period, the scan signal $Y_2$ is sustained at the H level.

In the nth frame period, the operations carried out on each of rows 1 and 2 are thereafter repeated for row 3, row 4, row 5 and so on to row 240 in an order of row 3, row 4, row 5 and so on to row 240. Thus, a positive-polarity voltage corresponding to a gradation component of a color display sub-pixel 101 is applied to the display pixel liquid-crystal capacitor 120 employed in every color display sub-pixel 101. In addition, a positive-polarity voltage corresponding to the ON/OFF state of the vision-angle control for a vision-angle control pixel 102 is applied to the vision-angle control pixel liquid-crystal capacitor 130 employed in every vision-angle control pixel 102.

Operations carried out next during the next (n+1)th frame period immediately lagging behind the nth frame period are identical with the operations carried out during the nth frame period except that, in the operations carried out next during the next (n+1)th frame period, the polarity of the voltages written into the display pixel liquid-crystal capacitor 120 and the vision-angle control pixel liquid-crystal capacitor 130 is the negative polarity which is the inverse of the positive polarity.

It is to be noted that, in the case of the negative polarity, the R-color data signal $X_{Rj}$ for the jth color display sub-pixel 101 counted from the left end of a row is set at a voltage which is a difference between the electric potential appearing on the display pixel electrode 118 on the low side and the voltage $V_{com}$ serving as a reference. This voltage is a voltage corresponding to an R-color gradation component specified by the display data bit Da for the R color of the R-color color display sub-pixel 101 included in the compound pixel placed at the intersection of row 1 and column j. In the timing diagram of FIG. 7, this voltage is a voltage indicated by symbol ↓. With the voltage $V_{com}$ taken as a reference, the vision-angle control circuit 160 sets a vision-angle control signal $X_{Cj}$ for the jth vision-angle control pixel 102 counted from the left end of the row at a voltage $V_{on(-)}$ obtained by inverting the voltage $V_{on(+)}$ applied during the sub-period in the nth frame period because the vision-angle control bit data Dc for the vision-angle control pixel 102 included in the pixels placed at the intersection of the row and column j specifies the ON state of the vision-angle control.

In addition to the data signal $X_{Rj}$ and the vision-angle control signal $X_{Cj}$ which have been described above, the timing diagram of FIG. 7 also shows the waveforms of a voltage $R_{(i,j)}$ and a voltage $C_{(i,j)}$. The voltage $R_{(i,j)}$ is a voltage appearing on the display pixel electrode 118 of the display pixel liquid-crystal capacitor 120 employed in the R-color color display sub-pixel 101 included in the compound pixel which is located at the intersection of row i and column j. On the other hand, the voltage $C_{(i,j)}$ is a voltage which appears on the vision-angle control pixel electrode 119 of the vision-angle control pixel liquid-crystal capacitor 130 employed in the vision-angle control pixel 102 included in the color display unit located at the intersection of row i and column j when the ON state of the vision-angle control has been specified.

With the scan signal $Y_i$ set at the H level, as the voltage $R_{(i,j)}$, the voltage of the data signal $X_{Rj}$ is applied to the display pixel electrode 118 of the display pixel liquid-crystal capacitor 120. Even if the scan signal $Y_i$ is changed from the H level to the L level thereafter, the voltage $R_{(i,j)}$ is sustained at the display pixel electrode 118 of the display pixel liquid-crystal capacitor 120 as it is. Since the other node of the display pixel liquid-crystal capacitor 120 is the common electrode 108 set at the voltage $V_{com}$, a voltage written into the display pixel liquid-crystal capacitor 120 of the R-color color display sub-pixel 101 included in the compound pixel located at the intersection of row i and column j and held in the display pixel liquid-crystal capacitor 120 is indicated as a hatched portion of the waveform of the voltage $R_{(i,j)}$ shown in the timing diagram of FIG. 7.

By the same token, with the scan signal $Y_i$ set at the H level, as the voltage $C_{(i,j)}$, the voltage of the vision-angle control signal $X_{Cj}$ is applied to the vision-angle control pixel electrode 119 of the vision-angle control pixel liquid-crystal capacitor 130. Even if the scan signal $Y_i$ is changed from the H level to the L level thereafter, the voltage $C_{(i,j)}$ is sustained at the vision-angle control pixel electrode 119 of the vision-angle control pixel liquid-crystal capacitor 130 as it is. Since the other node of the vision-angle control pixel liquid-crystal capacitor 130 is the common electrode 108 set at the voltage $V_{com}$, a voltage written into the vision-angle control pixel liquid-crystal capacitor 130 of the vision-angle control pixel 102 included in the color display unit located at the intersection of row i and column j and held in the vision-angle control pixel liquid-crystal capacitor 130 is indicated as a hatched portion of the waveform of the voltage $C_{(i,j)}$ shown in the timing diagram of FIG. 7.

It is to be noted that, with the OFF state of the vision-angle control specified for a vision-angle control pixel 102, the voltage $C_{(i,j)}$ appearing on the vision-angle control pixel electrode 119 employed in the vision-angle control pixel 102 is the voltage $V_{com}$ as shown in none of the waveforms of the timing diagram of FIG. 7. Thus, a zero voltage is written into the vision-angle control pixel liquid-crystal capacitor 130 employed in the vision-angle control pixel 102 and held in the vision-angle control pixel liquid-crystal capacitor 130.

In addition, in the timing diagram of FIG. 7, the vertical scales of the voltages of the data signal $X_{Rj}$ and the vision-angle control signal $X_{Cj}$ as well as the voltage $C_{(i,j)}$ and the voltage $R_{(i,j)}$ are properly increased relatively in comparison with the vertical scales of the voltages of the scan signals $Y_1$ to $Y_{240}$.

In accordance with the liquid-crystal display apparatus 10 implemented by this embodiment, the vision-angle control signal $X_{Cj}$ set at a voltage corresponding to the ON or OFF state of the vision-angle control is applied to all vision-angle control pixels 102 not at the same time. Instead, the vision-angle control signal $X_{Cj}$ set at a voltage corresponding to the ON or OFF state of the vision-angle control is applied to some vision-angle control pixels 102 included in a row and this operation to apply the vision-angle control signal $X_{Cj}$ to some vision-angle control pixels 102 is repeated for every row in an order of row 1, row 2, row 3 and so on to row 240 in order eventually apply the vision-angle control signal $X_{Cj}$ to all vision-angle control pixels 102. Thus, it is possible to reduce a load to be borne at a signal write time. As a result, a sufficient signal write operation can be carried out on the vision-angle control pixel liquid-crystal capacitor 130 employed in the vision-angle control pixel 102.

Figure 8:
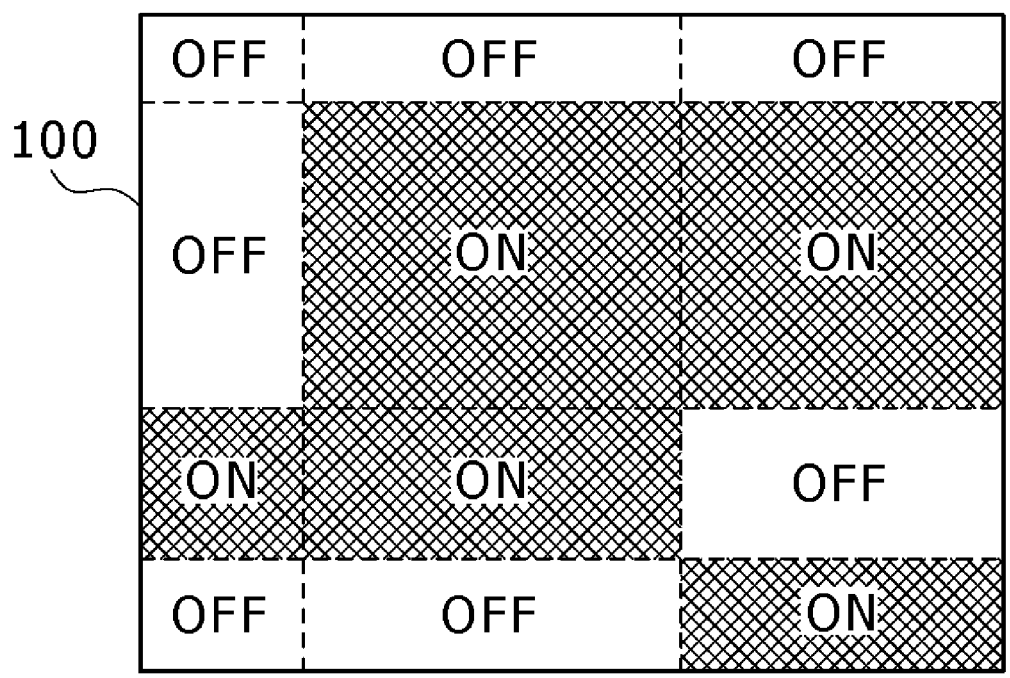
FIG. 8 is a diagram to be referred to in description of typical vision-angle control executed by the liquid-crystal display apparatus according to the first embodiment.

In addition, in this embodiment, the vision-angle control can be put in the ON or OFF state from color display unit to color display unit which includes a plurality of color display sub-pixels 101 and a vision-angle control pixel 102 as described earlier. Thus, the vision-angle control can be put in the ON or OFF state on the basis of an arbitrary display pattern. For example, as shown in a diagram of FIG. 8, the display panel 100 has a plurality of display areas each shown as a block. The vision-angle control for only specific ones of the display areas is put in an ON state in order to set a narrow vision-angle mode for the specific display areas. Thus, it is difficult to see the specific display areas from a position separated away from the display panel 100 in a direction inclined with respect to the display panel 100. On the other hand, the vision-angle control for the other ones of the display areas is put in an OFF state in order to set a wide vision-angle mode for the other display areas. Thus, it is easy to see the other display areas even from a position separated away from the display panel 100 in a direction inclined with respect to the display panel 100. In the diagram of FIG. 8, each of the specific display areas is shown as a dark block whereas each of the other display areas is shown as a white block. Thus, when different images varying from display area to display area are displayed in the display areas of the display panel 100, a specific image can be displayed in a display area with the vision-angle control thereof put in the ON state in the narrow vision-angle mode whereas another image can be displayed in a display area with the vision-angle control thereof put in the OFF state in the wide vision-angle mode. As a result, the specific image displayed in a display area with the vision-angle control thereof put in the ON state in the narrow vision-angle mode can be made difficult to see even if an attempt is made to see the specific image from a position separated away from the display panel 100 in a direction other the direction perpendicular to the front face. Accordingly, if the display panel 100 is installed in a central console of a car or the like for example, the specific image can be displayed on the display panel 100 so that a passenger sitting on a rear seat of the car is capable of seeing the specific image, but the driver sitting on the driver seat and a passenger sitting on the front seat of the car beside the driver are all but incapable of seeing the specific image.

It is to be noted that, as described above, each of the ON and OFF states of the vision-angle control is specified by vision-angle control bit data Dc. Thus, the display control circuit 20 specifies the ON state of the vision-angle control by making use of the vision-angle control bit data Dc for a vision-angle control pixel 102 pertaining to a display area for which the vision-angle control is to be set in the ON state. On the other hand, the display control circuit 20 specifies the OFF state of the vision-angle control by making use of the vision-angle control bit data Dc for a vision-angle control pixel 102 pertaining to a display area for which the vision-angle control is to be set in the OFF state.

In addition, if viewed from a standpoint of merely assuring a sufficient signal write operation carried out on the vision-angle control pixel liquid-crystal capacitor 130 employed in the vision-angle control pixel 102, it is not always necessary to specify the ON or OFF state of the vision-angle control for every vision-angle control pixel 102. That is to say, it is possible to provide a configuration in which the ON or OFF state of the vision-angle control is specified for every vision-angle control pixel unit including a plurality of vision-angle control pixels 102 employed in a plurality of adjacent color display units each having a plurality of color display sub-pixels 101 and a vision-angle control pixel 102. As another alternative, it is possible to provide a configuration in which a state of the vision-angle control is uniformly specified for all vision-angle control pixels 102.

Second Embodiment

In the case of the first embodiment described so far, the vision-angle control is put in an ON or OFF state represented by a binary value for every color display unit which includes a plurality of color display sub-pixels 101 and a vision-angle control pixel 102. In the case of a second embodiment, on the other hand, the ON state of the vision-angle control is further divided into two or more types of ON state. For example, the ON state of the vision-angle control is further divided into three ON state levels, i.e., the first, second and third ON state levels respectively. To put it in more detail, in the case of the second embodiment, the first ON state level is about the same as the ON state of the vision-angle control according to the first embodiment and is referred to as an ON1 state level. An ON state level closest to the OFF state of the vision-angle control according to the first embodiment is referred to as an ON3 state level whereas an ON state level between the ON1 state level and the ON3 state level is referred to as an ON2 state level. It is to be noted that, in the second embodiment, the OFF state of the vision-angle control according to the first embodiment is referred to as an OFF state level of the vision-angle control. Thus, in the case of the second embodiment, there are four state levels, i.e., the ON1, ON2, ON3 and OFF state levels of the vision-angle control. That is to say, in order to specify the ON1, ON2, ON3 and OFF state levels of the vision-angle control, it is necessary to apply ON1, ON2, ON3 and OFF voltages respectively to the vision-angle control pixel capacitor 130 between the common electrode 108 and the vision-angle control pixel electrode 119 which are employed in the vision-angle control pixel 102. The absolute values of the ON1, ON2, ON3 and OFF voltages satisfy the following relations:

ON1 voltage>ON2 voltage>ON3 voltage>OFF voltage

Figure 9A:
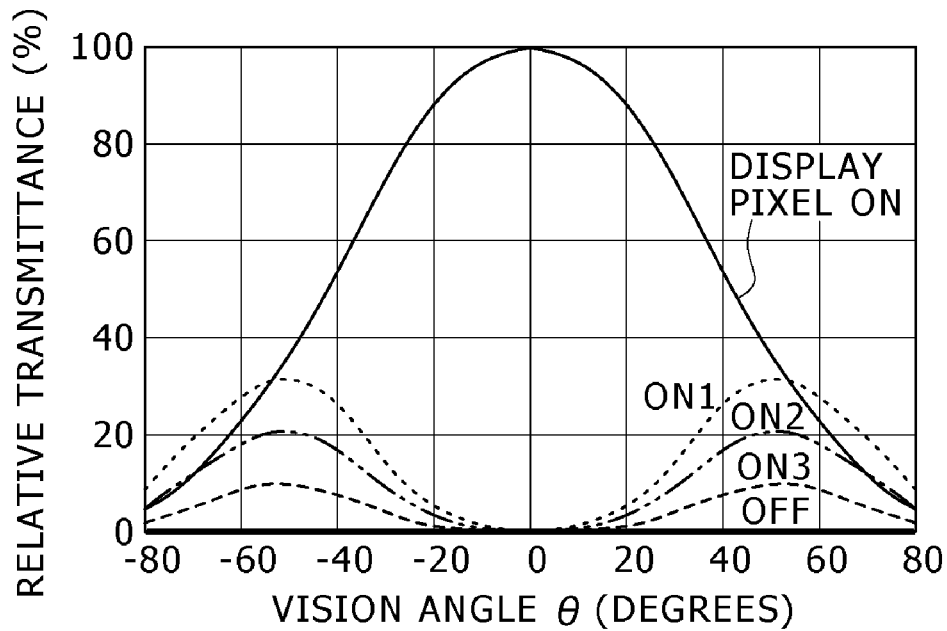
FIGS. 9A and 9B are a plurality of diagrams showing vision-angle characteristics of a liquid-crystal display apparatus according to a second embodiment.

When the voltage applied to the vision-angle control pixel capacitor 130 between the common electrode 108 and the vision-angle control pixel electrode 119 which are employed in the vision-angle control pixel 102 increases, the orientation direction of liquid-crystal molecules existing on the side of the device substrate 100a included in the vision-angle control pixel liquid-crystal capacitor 130 changes from a direction in an initial orientation state to a direction all but perpendicular to the substrate direction. If seen from a position separated away from the display panel 100 in a direction forming a vision angle θ of zero in conjunction with the direction perpendicular to the display panel 100, however, the orientation direction of the liquid-crystal molecules is hardly changed from the dark state because a phase difference in the liquid-crystal layer 105 is not generated. If seen from a position separated away from the display panel 100 in a direction inclined with respect to the direction forming a vision angle θ of zero in conjunction with the direction perpendicular to the display panel 100, that is, if seen from a position separated away from the display panel 100 in a direction forming a vision angle θ other than the vision angle θ of zero in conjunction with the direction perpendicular to the display panel 100, however, a phase difference in the liquid-crystal layer 105 is generated. Thus, as the voltage applied to the vision-angle control pixel liquid-crystal capacitor 130 increases, raising the relative transmittance of the vision-angle control pixel 102, the state level of the vision-angle control changes from OFF and approaches ON1 as is obvious from FIG. 9A which is a diagram showing also relations between the relative transmittance of the vision-angle control pixel 102 and the vision angle θ. It is to be noted that FIG. 9 is a plurality of diagrams showing vision-angle characteristics of the liquid-crystal display apparatus 10 according to the second embodiment. As described earlier, the OFF state level of the vision-angle control according to the second embodiment corresponds to the OFF state of the vision-angle control according to the first embodiment whereas the ON1 state level of the vision-angle control according to the second embodiment corresponds to approximately the ON state of the vision-angle control according to the first embodiment. Also as explained before, the OFF state of the vision-angle control according to the first embodiment is a state obtained as a result of applying an OFF voltage to the vision-angle control pixel liquid-crystal capacitor 130 whereas the ON state of the vision-angle control according to the first embodiment is a state obtained as a result of applying an ON voltage to the vision-angle control pixel liquid-crystal capacitor 130.

The phenomenon described above implies the following. If the vision-angle control pixel 102 is seen from a position separated away from the display panel 100 in a direction inclined with respect to the direction forming a vision angle θ of zero in conjunction with the direction perpendicular to the display panel 100, that is, if the vision-angle control pixel 102 is seen from a position separated away from the display panel 100 in a direction forming a vision angle θ other than the vision angle θ of zero in conjunction with the direction perpendicular to the display panel 100, as the voltage applied to the vision-angle control pixel liquid-crystal capacitor 130 increases, the relative transmittance of the vision-angle control pixel 102 rises. Thus, the contrast ratio of an image based on light transmitted by the color display sub-pixel 101 decreases so that the image becomes more difficult to visually recognize.

Figure 9B:
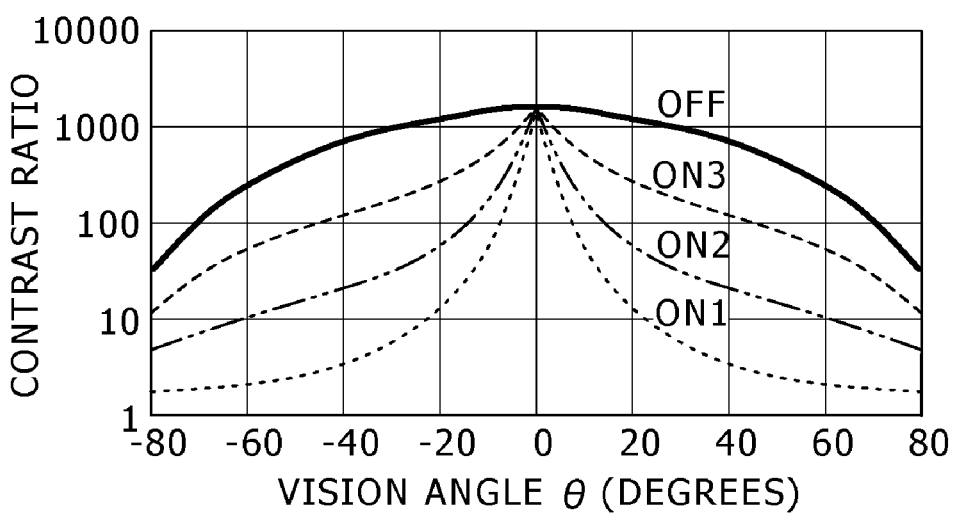

Thus, as is obvious from FIG. 9B which is a diagram showing relations between the contrast ratio of the image based on light transmitted by the color display sub-pixel 101 and the vision angle θ, if the vision-angle control pixel 102 is seen from a position separated away from the display panel 100 in a direction inclined with respect to the direction forming a vision angle θ of zero in conjunction with the direction perpendicular to the display panel 100, that is, if the vision-angle control pixel 102 is seen from a position separated away from the display panel 100 in a direction forming a vision angle θ other than the vision angle θ of zero in conjunction with the direction perpendicular to the display panel 100, the state level of the vision-angle control can be changed by gradually decreasing the contrast ratio of the image based on light transmitted by the color display sub-pixel 101 from a value for the OFF state level of the vision-angle control to a value for the ON1 state level of the vision-angle control.

As described above, in the case of the second embodiment, there are four state levels of the vision-angle control. Thus, the vision-angle control bit data Dc used for prescribing the four state levels of the vision-angle control is required to consist of at least 2 bits. For this reason, every storage location in the storage area included in the vision-angle control circuit 160 according to the second embodiment to serve as an area corresponding to the matrix of vision-angle control pixels 102 is used for storing 2-bit vision-angle control bit data Dc.

From the storage area, the vision-angle control circuit 160 reads out the 2-bit vision-angle control bit data Dc for vision-angle control pixels 102 each placed on a row of the matrix cited above to serve as a vision-angle control pixel 102 which is connected to a row scan line 112 selected by the scan-line driving circuit 140. In addition, the vision-angle control circuit 160 converts the 2-bit vision-angle control bit data Dc read out from the storage area as vision-angle control bit data Dc specifying the ON1, ON2, ON3 or OFF state level of the vision-angle control into a vision-angle control signal $X_{Cj}$ set at a voltage corresponding to respectively the ON1, ON2, ON3 or OFF state level of the vision-angle control. Subsequently, the vision-angle control circuit 160 asserts the vision-angle control signals $X_{Cj}$ on the vision-angle control lines 115 which then convey the signals to the vision-angle control pixels 102. The vision-angle control circuit 160 concurrently supplies the vision-angle control signals $X_{Cj}$ to the vision-angle control pixels 102 connected to a row scan line 112 selected by the scan-line driving circuit 140 for all the 320 columns allocated to the vision-angle control pixels 102.

To put it in detail, the vision-angle control circuit 160 reads out 2-bit vision-angle control bit data Dc for vision-angle control pixels 102 placed on the row and converts the 2-bit vision-angle control bit data Dc into vision-angle control signals $X_{Cj}$. To be more specific, as shown by the waveform of the vision-angle control signal $X_{Cj}$ in FIG. 10 which is a timing diagram to be referred to in description of operations carried out by the liquid-crystal display apparatus 10 according to the second embodiment, in the case of the positive polarity, if the 2-bit vision-angle control bit data Dc specifies the ON1 state level of the vision-angle control, the vision-angle control circuit 160 sets the vision-angle control signal $X_{Cj}$ at a voltage $V_{on1(+)}$. If the 2-bit vision-angle control bit data Dc specifies the ON2 state level of the vision-angle control, the vision-angle control circuit 160 sets the vision-angle control signal $X_{Cj}$ at a voltage $V_{on2(+)}$. If the 2-bit vision-angle control bit data Dc specifies the ON3 state level of the vision-angle control, the vision-angle control circuit 160 sets the vision-angle control signal $X_{Cj}$ at a voltage $V_{on3(+)}$. If the 2-bit vision-angle control bit data Dc specifies the OFF state level of the vision-angle control, however, the vision-angle control circuit 160 sets the vision-angle control signal $X_{Cj}$ at the voltage $V_{com}$. In the case of the negative polarity, on the other hand, if the 2-bit vision-angle control bit data Dc specifies the ON1 state level of the vision-angle control, the vision-angle control circuit 160 sets the vision-angle control signal $X_{Cj}$ at a voltage $V_{on1(-)}$. If the 2-bit vision-angle control bit data Dc specifies the ON2 state level of the vision-angle control, the vision-angle control circuit 160 sets the vision-angle control signal $X_{Cj}$ at a voltage $V_{on2(-)}$. If the 2-bit vision-angle control bit data Dc specifies the ON3 state level of the vision-angle control, the vision-angle control circuit 160 sets the vision-angle control signal $X_{Cj}$ at a voltage $V_{on3(-)}$. If the 2-bit vision-angle control bit data Dc specifies the OFF state level of the vision-angle control, however, the vision-angle control circuit 160 sets the vision-angle control signal $X_{Cj}$ at the voltage $V_{com}$.

In addition to the vision-angle control signal $X_{Cj}$ described above, the timing diagram of FIG. 10 also shows the waveform of the voltage $C_{(i,j)}$ which appears on the vision-angle control pixel electrode 119 employed in a vision-angle control pixel 102 located at the intersection of row i and column j when the ON1 state level of the vision-angle control has been specified.

Figure 10:
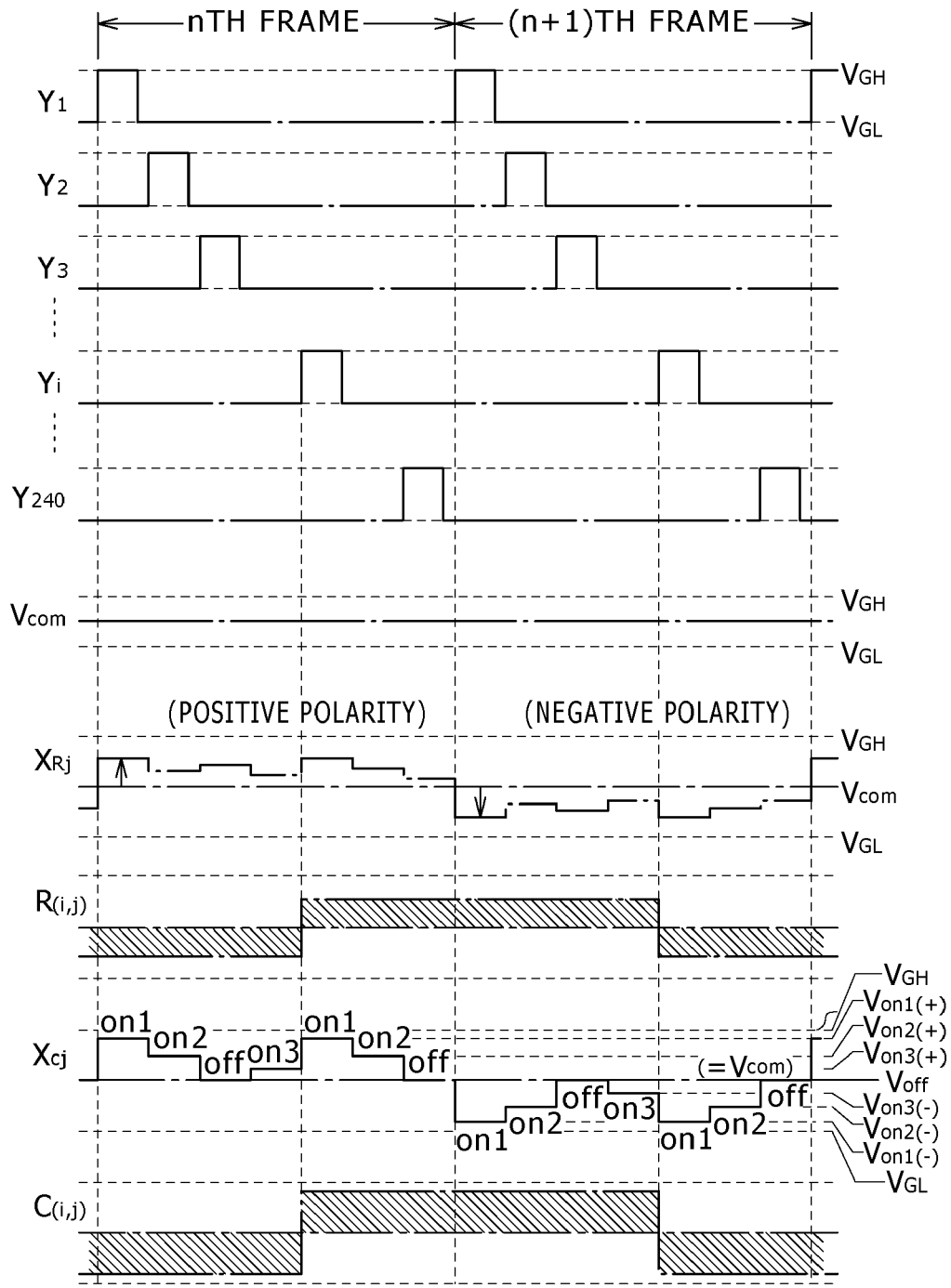
FIG. 10 is a timing diagram to be referred to in description of operations carried out by the liquid-crystal display apparatus according to the second embodiment.

As is obvious from the waveform of the vision-angle control signal $X_{Cj}$ shown in the timing diagram of FIG. 10, each of the positive-polarity voltage $V_{on1(+)}$, the positive-polarity voltage $V_{on2(+)}$, the positive-polarity voltage $V_{on3(+)}$, the negative-polarity voltage $V_{on1(-)}$, the negative-polarity voltage $V_{on2(-)}$ and the negative-polarity voltage $V_{on3(-)}$ is a voltage which is obtained with by taking the voltage $V_{com}$ applied to the common electrode 108 as a reference.

Figure 11:
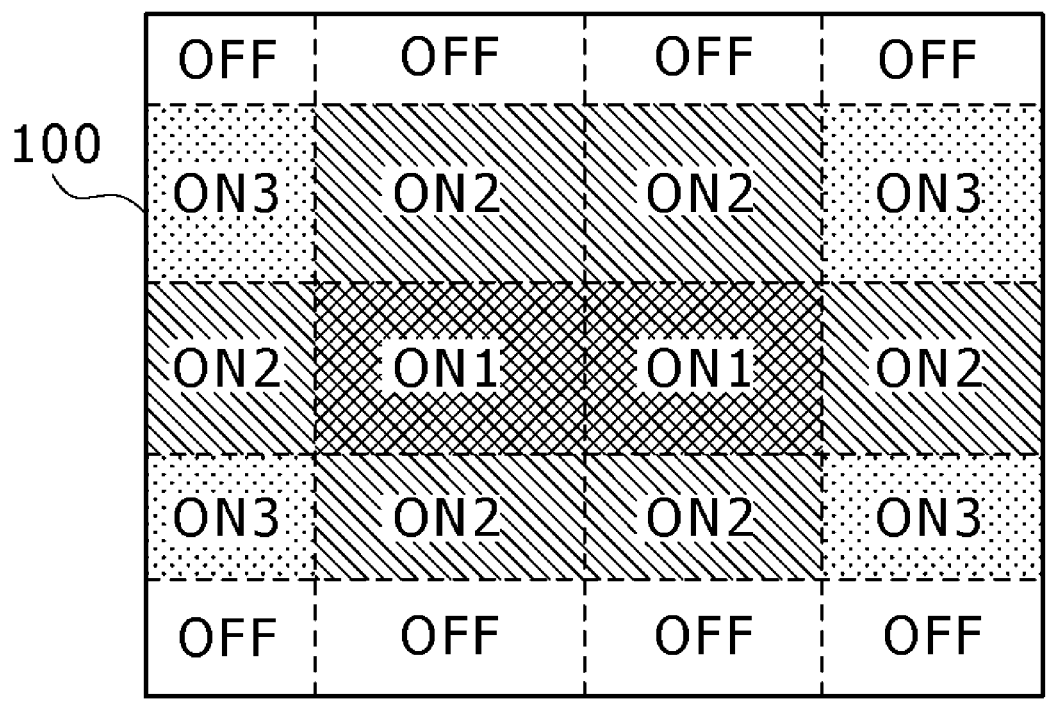
FIG. 11 is a diagram to be referred to in description of typical vision-angle control executed by the liquid-crystal display apparatus according to the second embodiment.

In the case of the second embodiment, it is possible to change the state level of the vision-angle control of every color display unit including a plurality of color display sub-pixels 101 and a vision-angle control pixel 102. For example, as shown in a diagram of FIG. 11 which is a diagram to be referred to in description of typical vision-angle control executed by the liquid-crystal display apparatus 10 according to the second embodiment, the display panel 100 has a plurality of display areas each shown as a block. The vision-angle control for only specific ones of the display areas is put at the ON1 state level. The specific display areas which are each shown as a very dark block in the diagram of FIG. 11 to indicate that the vision-angle control for the specific display area is put at the ON1 state level are used for displaying information that may raise a problem if seen by other persons. Typical examples of the information not to be revealed to other persons are a user identification number, a user password and a user secret number. The specific display areas with the vision-angle control thereof put at the ON1 state level are surrounded by other display areas which are each shown as a dark block in the diagram of FIG. 11 to indicate that the vision-angle control for the other display area is put at the ON2 state level and by further display areas. Each of the further display areas is shown as a slightly dark block in the diagram of FIG. 11 to indicate that the vision-angle control for the further display area is put at the ON3 state level. The other display areas with the vision-angle control thereof put at the ON2 state level and the further display areas with the vision-angle control thereof put at the ON3 state level are further surrounded by outermost display areas which are each shown as a white block in the diagram of FIG. 11 to indicate that the vision-angle control for the outermost display area is put at the OFF state level. In this way, the state levels of the vision-angle control in the display areas of the display panel 100 can be changed stage by stage in accordance with information which is to be displayed in the display areas.

It is to be noted that, much like the first embodiment, if viewed from a standpoint of assuring a sufficient signal write operation carried out on the vision-angle control pixel liquid-crystal capacitor 130 employed in the vision-angle control pixel 102, also in the case of the second embodiment, it is not necessary to always specify the ON1, ON2, ON3 or OFF state level of the vision-angle control for every vision-angle control pixel 102. That is to say, it is possible to provide a configuration in which the ON1, ON2, ON3 or OFF state level of the vision-angle control is specified for every vision-angle control pixel unit including a plurality of vision-angle control pixels 102 employed in a plurality of adjacent color display units each having a plurality of color display sub-pixels 101 and a vision-angle control pixel 102. As another alternative, it is possible to provide a configuration in which a state level of the vision-angle control is uniformly specified for all vision-angle control pixels 102.

In addition, in the case of the second embodiment, the ON state of the vision-angle control is divided into three state levels as described above. It is to be noted, however, that the ON state of the vision-angle control can also be divided into two state levels. It is also needless to say that the ON state of the vision-angle control can also be divided into four or more state levels.

Applications/Modified Versions

The scope of the present application is not limited to the first and second embodiments described herein, and thus may be applied in a suitable manner, such as described further below.

First Application/Modified Version

Figure 12:
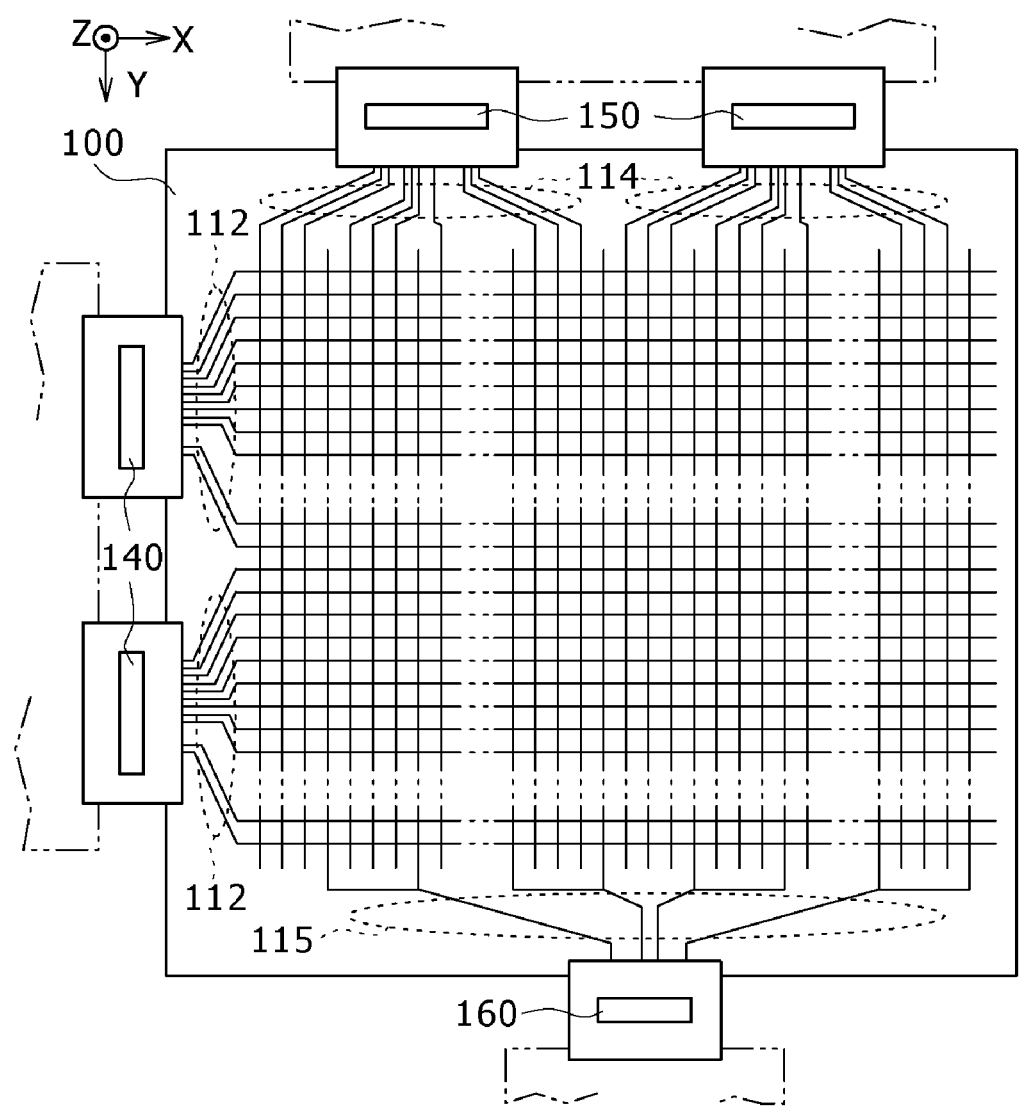
FIG. 12 is a diagram showing the configuration of a liquid-crystal display apparatus according to a first typical application/modified version.

In the first application/modified version, for example, the vision-angle control circuit 160 does not drive the vision-angle control lines 115 individually. Instead, the display panel 100 is designed into a configuration in which the vision-angle control circuit 160 drives the vision-angle control lines 115 in 2-column units as shown in a diagram of FIG. 12. FIG. 12 is a diagram showing the configuration of a liquid-crystal display apparatus 10 according to a first typical application/modified version. It is also needless to say that the vision-angle control circuit 160 may also drive the vision-angle control lines 115 in units which each consist of three or more matrix columns.

If the vision-angle control circuit 160 drives the vision-angle control lines 115 in units which each consist of two or more matrix columns as described above, the number of vision-angle control signals $X_{Cj}$ output by the vision-angle control circuit 160 can be reduced. Thus, the configuration of the vision-angle control circuit 160 can be simplified and, as a result, the cost can be reduced. In addition, it is possible to decrease the number of connection points connecting the vision-angle control circuit 160 to the vision-angle control lines 115. Accordingly, the connection pitch can be decreased.

Second Application/Modified Version

In the case of the first and second embodiments, the vision-angle control circuit 160 and the data-line driving circuit 150 are provided on respectively two opposite sides of the matrix of pixels so that the vision-angle control lines 115 connected to the vision-angle control circuit 160 do not intersect with the data lines 114 connected to the data-line driving circuit 150. In other words, if the vision-angle control lines 115 connected to the vision-angle control circuit 160 undesirably intersect with the data lines 114 connected to the data-line driving circuit 150 through an insulator, the insulator creates a capacitive element so that a noise caused by voltage switching on a column vision-angle control line 115 is superposed on a column data line 114 by way of the capacitive element which exists at the intersection of the column vision-angle control line 115 and the column data line 114. Thus, the noise affects a voltage written into the color display sub-pixel 101. As a result, the quality of a displayed image deteriorates. In order to prevent the quality of a displayed image from deteriorating, in the case of the first and second embodiments, the vision-angle control circuit 160 and the data-line driving circuit 150 are provided on respectively two opposite sides of the matrix of pixels so that the vision-angle control lines 115 connected to the vision-angle control circuit 160 do not intersect with the data lines 114 connected to the data-line driving circuit 150.

Figure 13:
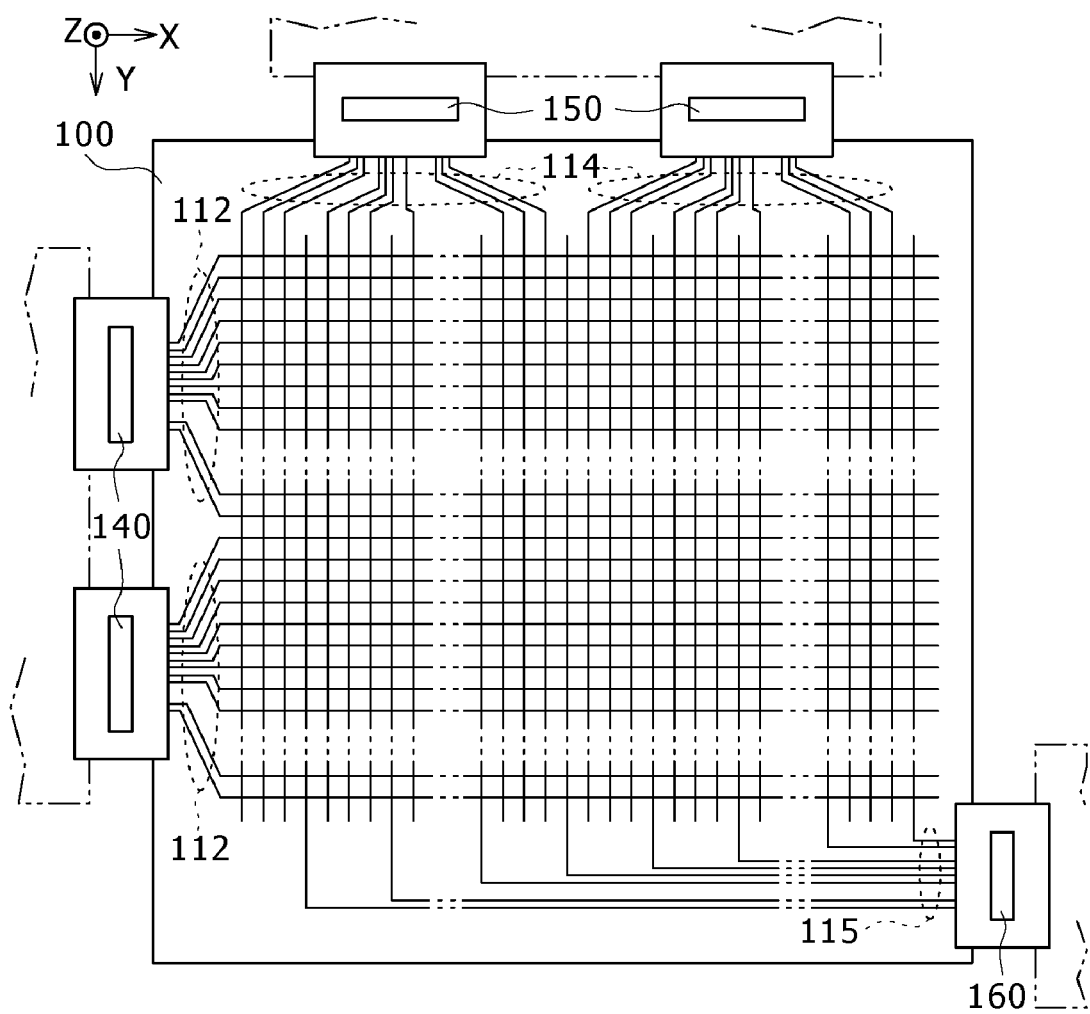
FIG. 13 is a diagram showing the configuration of a liquid-crystal display apparatus according to a second typical application/modified version.

As another technique for preventing the vision-angle control lines 115 connected to the vision-angle control circuit 160 from intersecting with the data lines 114 connected to the data-line driving circuit 150 for example, as shown in FIG. 13 which is a diagram showing the configuration of a liquid-crystal display apparatus 10 according to the second typical application/modified version, the vision-angle control circuit 160 is moved to a location on a side opposite to the scan-line driving circuit 140 with respect to the matrix of pixels but the vision-angle control lines 115 are bent so that the vision-angle control lines 115 connected to the vision-angle control circuit 160 do not intersect with the data lines 114 connected to the data-line driving circuit 150. As an alternative, the vision-angle control circuit 160 is moved to a location on the same side as the scan-line driving circuit 140 but the vision-angle control lines 115 are bent in a direction opposite to the bending direction shown in the diagram of FIG. 13 so that the vision-angle control lines 115 connected to the vision-angle control circuit 160 do not intersect with the data lines 114 connected to the data-line driving circuit 150.

Third Application/Modified Version

Figure 14:
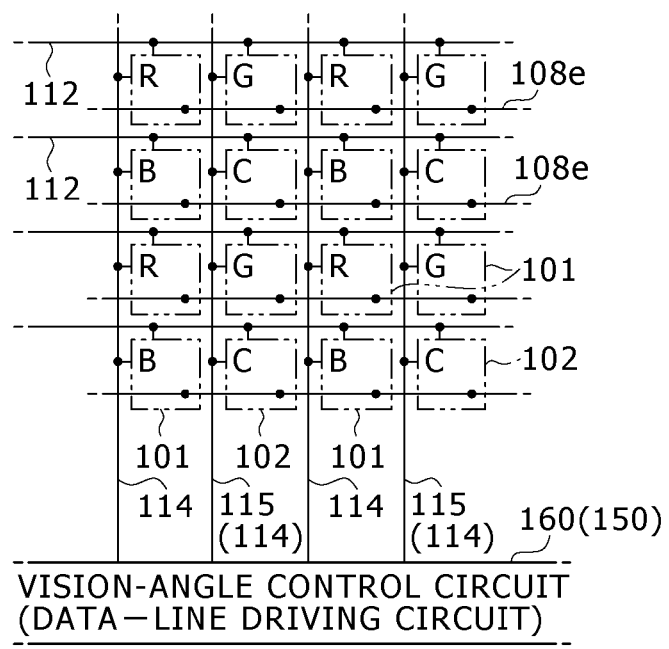
FIG. 14 is a diagram showing the configuration of a liquid-crystal display apparatus according to a third typical application/modified version.

Strictly speaking, the aforementioned matrix of pixels is a matrix of color display units which each include R, G and B color display sub-pixels 101 and a vision-angle control pixel 102. The configuration of the color display unit matrix is by no means limited to the pixel matrix shown in the block diagram of FIG. 1. For example, every color display unit can also be configured to include 4 (=2×2) pixels, i.e., R, G, B and C pixels which are R, G and B color display sub-pixels 101 and a vision-angle control pixel 102 respectively as shown in a FIG. 14. In such a matrix of color display units each having R, G and B pixels serving R, G and B color display sub-pixels 101 respectively and a C pixel serving as a vision-angle control pixel 102, the column vision-angle control line 115 for every vision-angle control pixel 102 is also used as the column data line 114 for the color display sub-pixel 101 of the G color. Thus, the vision-angle control circuit 160 also carries out the functions of the data-line driving circuit 150. To put it in detail, when the R and G row scan line 112 is selected, the vision-angle control circuit 160 asserts a data signal set at a voltage corresponding to the R gradation component on the column data line 114 and a data signal set at a voltage corresponding to the G gradation component on the column vision-angle control line 115 which functions as a column data line 114. When the B and C row scan line 112 is selected, on the other hand, the vision-angle control circuit 160 asserts a data signal set at a voltage corresponding to the B gradation component on the column data line 114 and a vision-angle control signal $X_{Cj}$ set at a voltage corresponding to the ON or OFF state of the vision-angle control on the column vision-angle control line 115 which functions as a column data line 114.

Fourth Application/Modified Version

In accordance with the above description, the voltage $V_{com}$ applied to the common electrode 108 is taken as the reference of the written voltage polarity. The use of the voltage $V_{com}$ applied to the common electrode 108 as the reference of the written voltage polarity raises no problem if each of the TFTs 116 and 117 functions as an ideal switch. In actuality, however, due to a parasitic capacitor existing between the gate and drain electrodes of the TFTs 116 and/or 117, the so-called push-down, come-out or field-through phenomenon occurs in the course of a transition from a turned-on state of the TFTs 116 and/or 117 to the turned-off state of the TFTs 116 and/or 117. In this phenomenon, an electric potential appearing on the drain electrode serving as the display pixel electrode 118 (or the vision-angle control pixel electrode 119) falls down. In order to prevent the liquid-crystal layer from deteriorating, the display pixel liquid-crystal capacitor 120 and the vision-angle control pixel liquid-crystal capacitor 130 need to be driven by making use of an AC voltage. If the display pixel liquid-crystal capacitor 120 and the vision-angle control pixel liquid-crystal capacitor 130 are driven by making use of an AC voltage taking the voltage $V_{com}$ appearing on the common electrode 108 as the reference of the polarity of the AC voltage, however, due to the push-down phenomenon, the effective value of a voltage appearing on the display pixel liquid-crystal capacitor 120 or the vision-angle control pixel liquid-crystal capacitor 130 as a result of a negative-polarity voltage write operation is slightly greater than the effective value of a voltage appearing on the display pixel liquid-crystal capacitor 120 or the vision-angle control pixel liquid-crystal capacitor 130 as a result of a positive-polarity voltage write operation in the case of the TFT 116 or 117 implemented by an n-channel transistor.

In order to solve the problem described above, the reference voltage of the written voltage polarity is isolated from the voltage $V_{com}$ applied to the common electrode 108 and the reference voltage of the written voltage polarity is set at a level higher than the level of the voltage $V_{com}$ applied to the common electrode 108 in order to have effects of the push-down phenomenon cancel each other.

As an alternative, there is provided a configuration in which, when each of the ON voltage $V_{on(+)}$ of the positive polarity and the ON voltage $V_{on(-)}$ of the negative polarity is supplied as a vision-angle control signal $X_{Cj}$, the ON voltage $V_{on(+)}$ of the positive polarity and the ON voltage $V_{on(-)}$ of the negative polarity can be individually adjusted in order to have effects of the push-down phenomenon cancel each other.

In addition, the vision-angle control signal $X_{Cj}$ for the OFF state of the vision-angle control is by no means limited to a voltage at the same level as the voltage $V_{com}$ applied to the common electrode 108. That is to say, the vision-angle control signal $X_{Cj}$ for the OFF state of the vision-angle control can be any voltage as long as this voltage causes a voltage applied to the vision-angle control pixel liquid-crystal capacitor 130 to be set at a level not higher than the level of a threshold voltage. For this reason, it is possible to provide a configuration in which, in the case of the positive polarity, the vision-angle control signal $X_{Cj}$ for the OFF state of the vision-angle control is set at an OFF voltage $V_{off(+)}$ slightly higher than the voltage $V_{com}$ (or a reference voltage having a polarity) and, in the case of the negative polarity, on the other hand, the vision-angle control signal $X_{Cj}$ for the OFF state of the vision-angle control is set at an OFF voltage $V_{off(-)}$ slightly lower than the voltage $V_{com}$ (or the reference voltage). It is to be noted, however, that this configuration is shown in none of the figures.

Fifth Application/Modified Version

In a fifth application/modified version, instead of sustaining the common electrode 108 at the voltage $V_{com}$ which does not change with the lapse of time, the common electrode 108 is put at a relatively low voltage in the case of the positive polarity and a relatively high voltage in the case of the negative polarity. In addition, the common electrode 108 does not have to be used as an electrode common to all color display sub-pixels 101 and all vision-angle control pixels 102. For example, a common electrode 108 for a matrix row can be isolated from a common electrode 108 for any other matrix row. As described earlier, a matrix row corresponds to a row scan line 112.

Other Applications/Modified Versions

In addition, each of the color display sub-pixel 101 and the vision-angle control pixel 102 does not have to be a pixel of the transmission type, but can be a pixel of the reflection type.

In the case of a pixel having the reflection type, the common electrode 108 can be created by carrying out a patterning process on a conductive layer having a reflective property. As an alternative, the common electrode 108 can also be created by separately providing a metallic layer having a reflective property. As another alternative, each of the color display sub-pixel 101 and the vision-angle control pixel 102 can be a pixel of the so-called semi-transmissive and semi-reflective type which is a type obtained by combining both the transmission type and the reflection type.

In addition, the color display sub-pixels 101 are by no means limited to the R, G and B display sub-pixels. For example, the color display sub-pixel 101 for the G color can be further divided into a display sub-pixel for a YG (yellow green) color and a display sub-pixel for a EG (emerald green) color to result in four display sub-pixels for the R, YG, EG and B colors respectively. The four display sub-pixels for the R, YG, EG and B colors respectively form sub-pixels of a color display unit, constructing a configuration for widening the color band.

On top of that, it is also possible to provide a configuration in which, in place of a multi-color display, a single-color display can be produced. In the configuration for generating a single-color display, each display pixel serves as a single-color display unit and, in addition, a vision-angle control pixel 102 is provided for every single-color display unit. Furthermore, each display pixel serving as a single-color display unit typically has a configuration equivalent to the configuration of the color display sub-pixel 101 without a color filter (or a filter for the color of the display pixel).

In addition, the polarities of the voltage write operation are by no means limited to the polarities determined for frame periods in accordance with the frame reversal method. For example, it is also possible to adopt any one selected from a variety of methods such as a row (line) reversal method, a column reversal method and a pixel reversal method.

Electronic Apparatus

Figure 15:
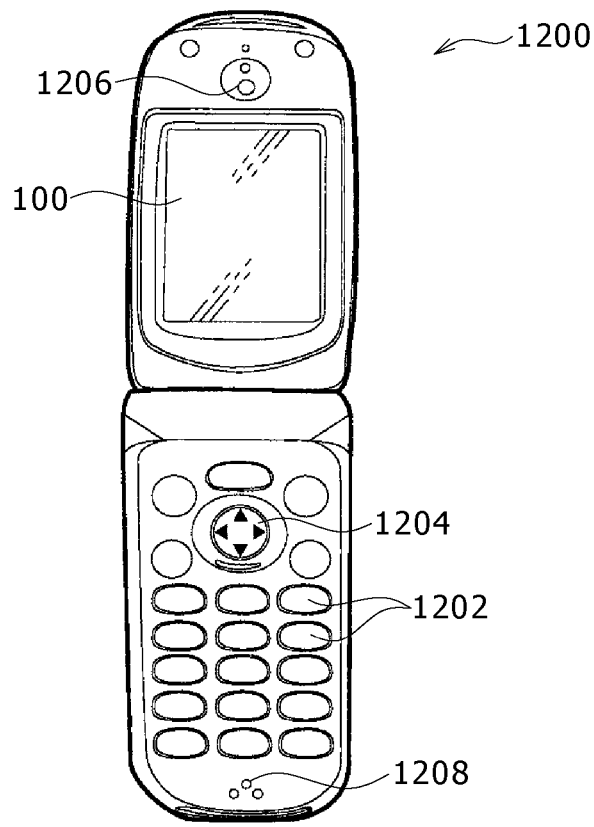
FIG. 15 is a diagram showing a mobile phone employing a liquid-crystal display apparatus according to any of the embodiments or any of the typical applications/modified versions.

Next, the following description explains an electronic apparatus which employs the liquid-crystal display apparatus 10 according to one of the first and second embodiments or any of the applications/modified versions described above. FIG. 15 is a diagram showing a mobile phone 1200 which employs the liquid-crystal display apparatus 10 according to any of the first and second embodiments or any of the applications/modified versions described above.

As shown in the diagram of FIG. 15, the mobile phone 1200 has a plurality of operation buttons 1202, a direction key 1204, a voice receiving section 1206, a voice transmitting section 1208 and the liquid-crystal display apparatus 10 described so far. It is to be noted that only the display panel 100 of the components employed in the liquid-crystal display apparatus 10 appears as an external section. The other components employed in the liquid-crystal display apparatus 10 are embedded inside the case of the mobile phone 1200.

It is to be noted that the liquid-crystal display apparatus 10 according to any of the first and second embodiments or any of the applications/modified versions described above can also be employed in electronic apparatus other than the mobile phone 1200 shown in the diagram of FIG. 15. The electronic apparatus other than the mobile phone 1200 are apparatus which each have a display section to be implemented as the liquid-crystal display apparatus 10. Typical electronic apparatus other than the mobile phone 1200 apparatus include a digital still camera, a notebook computer, a liquid-crystal TV, a video recorder of a view-finder type (or a monitor straight gaze type), a car navigation apparatus, an electronic notebook, a calculator, a word processor, a work station, a TV phone and any apparatus having a touch panel.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid-crystal display apparatus comprising:
display pixels each located at an intersection of a scan line and a data line and each provided with
a display-pixel switching device having a specific node connected to said data line and another node which is connected to said specific node to establish a conductive state of said display-pixel switching device when a select voltage is applied to said scan line,
a display pixel electrode connected to said other node of said display-pixel switching device, and
a liquid-crystal layer driven by a voltage appearing between said display pixel electrode and a common electrode;
vision-angle control pixels each located at an intersection of said scan line and a vision-angle control line and each provided with
a vision-angle control pixel switching device having a specific node connected to said vision-angle control line and another node which is connected to said specific node to establish a conductive state of said vision-angle control pixel switching device when a select voltage is applied to said scan line,
a vision-angle control pixel electrode connected to said other node of said vision-angle control pixel switching device, and
a transmittance exhibited for a vision angle to serve as a transmittance with a characteristic different from that of the transmittance of said display pixel or a reflectance exhibited for a vision angle to serve as a reflectance with a characteristic different from that of the reflectance of said display pixel;
a scan-line driving circuit for sequentially selecting a scan line from a plurality of said scan lines in an order determined in advance and applying said select voltage to said selected scan line; and
a vision-angle control circuit for supplying a vision-angle control signal set at a voltage corresponding to vision-angle control to said vision-angle control pixel connected to said selected scan line, to which said select voltage has been applied, through said vision-angle control line.

2. The liquid-crystal display apparatus according to claim 1, further comprising
a data-line driving circuit for supplying a data signal set at a voltage corresponding to a gradation component of said display pixel connected to said selected scan line, to which said select voltage has been applied, to said display pixel through said data line.

3. The liquid-crystal display apparatus according to claim 2, wherein
said vision-angle control circuit drives two or more said vision-angle control lines as a group of lines in bulk.

4. The liquid-crystal display apparatus according to claim 2, wherein
said vision-angle control circuit provides a vision-angle control signal set at a voltage corresponding to an ON or OFF state of said vision-angle control to every two or more said vision-angle control pixels.

5. The liquid-crystal display apparatus according to claim 2, wherein
said vision-angle control circuit provides a vision-angle control signal set at a voltage corresponding to a state level of said vision-angle control to every two or more said vision-angle control pixels.

6. The liquid-crystal display apparatus according to claim 2, wherein
said vision-angle control lines are provided in such a way that said vision-angle control lines do not intersect with said data lines.

7. An electronic apparatus employing a liquid-crystal display apparatus including:
   display pixels each located at an intersection of a scan line and a data line and each provided with
   a display-pixel switching device having a specific node connected to said data line and another node which is connected to said specific node to establish a conductive state of said display-pixel switching device when a select voltage is applied to said scan line,
   a display pixel electrode connected to said other node of said display-pixel switching device, and
   a liquid-crystal layer driven by a voltage appearing between said display pixel electrode and a common electrode;
   vision-angle control pixels each located at an intersection of said scan line and a vision-angle control line and each provided with
   a vision-angle control pixel switching device having a specific node connected to said vision-angle control line and another node which is connected to said specific node to establish a conductive state of said vision-angle control pixel switching device when a select voltage is applied to said scan line,
   a vision-angle control pixel electrode connected to said other node of said vision-angle control pixel switching device, and
   a transmittance exhibited for a vision angle to serve as a transmittance with a characteristic different from that of the transmittance of said display pixel or a reflectance exhibited for a vision angle to serve as a reflectance with a characteristic different from that of the reflectance of said display pixel;
   a scan-line driving circuit for sequentially selecting a scan line from a plurality of said scan lines in an order determined in advance and applying said select voltage to said selected scan line; and
   a vision-angle control circuit for supplying a vision-angle control signal set at a voltage corresponding to vision-angle control to said vision-angle control pixel connected to said selected scan line, to which said select voltage has been applied, through said vision-angle control line.

* * * * *